(12) United States Patent
Xu et al.

(10) Patent No.: US 9,106,342 B2
(45) Date of Patent: Aug. 11, 2015

(54) DEVICE AND METHOD FOR MODULATING TRANSMISSION OF TERAHERTZ WAVES

(75) Inventors: Quinfan Xu, Houston, TX (US); Jie Shu, Houston, TX (US); Daniel M. Mittleman, Houston, TX (US); Ciyuan Qiu, Houston, TX (US)

(73) Assignee: William Marsh Rice University, Houston, TX (US)

( * ) Notice: Subject to any disclaimer, the term of this patent is extended or adjusted under 35 U.S.C. 154(b) by 114 days.

(21) Appl. No.: 14/113,728

(22) PCT Filed: May 3, 2012

(86) PCT No.: PCT/US2012/036289
§ 371 (c)(1),
(2), (4) Date: Oct. 24, 2013

(87) PCT Pub. No.: WO2012/151380
PCT Pub. Date: Nov. 8, 2012

(65) Prior Publication Data
US 2014/0048710 A1 Feb. 20, 2014

Related U.S. Application Data

(60) Provisional application No. 61/482,026, filed on May 3, 2011.

(51) Int. Cl.
*H04B 10/40* (2013.01)
*G01J 5/08* (2006.01)
(Continued)

(52) U.S. Cl.
CPC .............. *H04B 10/501* (2013.01); *B82Y 20/00* (2013.01); *G01J 5/08* (2013.01); *G02F 1/025* (2013.01); *H01Q 15/0053* (2013.01); *G02F 2203/13* (2013.01)

(58) Field of Classification Search
CPC .... H04B 10/40; H04B 10/21; H01Q 15/0053; G01J 5/08; G01J 5/0803; G01J 1/0407; G01J 1/04; G02F 2203/13
See application file for complete search history.

(56) References Cited

U.S. PATENT DOCUMENTS

2008/0296710 A1* 12/2008 Tonucci ........................ 257/421
2011/0210903 A1* 9/2011 Sarabandi et al. ............ 343/904
2012/0057616 A1* 3/2012 Padilla et al. ................. 374/179

OTHER PUBLICATIONS

International Search Report for corresponding International Application No. PCT/US2012/036289, mailed Apr. 26, 2013 (3 pages).

(Continued)

*Primary Examiner* — Yara B Green
(74) *Attorney, Agent, or Firm* — Osha Liang LLP

(57) ABSTRACT

A device for modulating terahertz waves includes a metal layer (703) including a continuous metal portion (705) and island metal portions (707). The metal portions (705, 707) are separated by apertures (709). The device further includes a semiconductor layer (715) affixed to a bottom surface of the metal layer (703). The semiconductor layer (715) includes carrier regions (717) located below the apertures (709). The transmission of terahertz waves through the apertures (709) is modulated by changing a voltage applied across the aperture via voltage source (715). By injecting free carriers into carrier regions (717) due to a change of the voltage an extraordinary terahertz transmission effect of the metal layer (703) can be switched off. A small increase in the free-carrier absorption is significantly enhanced by the Fabry-Perot resonance, resulting in a substantial decrease in transmission. The disclosed ring aperture terahertz modulator allows for electrical control of the carrier density only in the area underneath the aperture. This design minimizes the power consumption and maximizes the operation speed.

20 Claims, 18 Drawing Sheets

(51) Int. Cl.
  *H04B 10/50* (2013.01)
  *B82Y 20/00* (2011.01)
  *G02F 1/025* (2006.01)
  *H01Q 15/00* (2006.01)

(56) References Cited

OTHER PUBLICATIONS

Written Opinion for corresponding International Application No. PCT/US2012/036289, mailed Apr. 26, 2013 (15 pages).
H. Chen et al., "Hybrid metamaterials enable fast electrical modulation of freely propagating terahertz waves"; Applied Physics Letters 93, 091117 (2008), American Institute of Physics, Sep. 4, 2008, Melville, NY, US; vol. 93, No. 9; (3 pages).
Y. Chang et al., "Surface plasmon on aluminum concentric rings arranged in a long-range periodic structure"; Applied Physics Letters 92, 25311 (2008), American Institute of Physics, Jun. 25, 2008, Melville, NY, US; vol. 92, No. 25; (3 pages).
J. Shu et al., "High-contrast terahertz modulator based on extraordinary transmission through a ring aperture"; Optics Express, vol. 19, No. 27; Dec. 19, 2011; pp. 26666-26671 (6 pages).
W. Chan et al., "Single-pixel terahertz camera speeds measurement"; Laser Focus World, Pennwell; Tulsa, Oklahoma, US; vol. 44, No. 9; Sep. 1, 2008; pp. 73-75 (3 pages).
J. Shu et al., "Resonant transmission of Ring Aperture for Switching Terahertz Waves"; Conference on Lasers and Electro-Optics (CLEO) 2011, CLEO: Science and Innovations, Baltimore, MD, USA; May 1-6, 2011 (2 pages).
Y. Poujet et al., "90% Extraordinary Optical Transmission in the Visible Range Through Annular Aperture Metallic Arrays"; Optics Letters, OSA, Optical Society of America, Washington, DC, US; vol. 32, No. 20; Oct. 15, 2007; pp. 2942-2944 (3 pages).
Q. Xu et al., "Micrometre-scale Silicon Electro-Optic Modulator"; International Weekly Journal of Science, Nature Publishing Group, United Kingdom; vol. 435, No. 7040; May 19, 2005; pp. 325-327 (3 pages).

W.L. Chan et al., "A Single-pixel terhertz imaging system based on compressed sensing," Appl. Phys. Lett. 93, 121105 (2008) (4 pages).
T. Kleine-Ostmann et al., "Audio signal transmission over THz communication channel using semiconductor modulator," Electron. Lett. 40, 124 (2004) (2 pages).
C. Jastrow et al., "300 GHz transmission system," Electron. Lett. 44, 213 (2008) (2 pages).
R. Kersting et al., "Terahertz phase modulator," Electron. Lett. 36, 1156 (2000) (3 pages).
I. H. Libon et al., "An optically controllable terahertz fileter," Appl. Phys. Lett. 76, 2821 (2000) (4 pages).
H.-T. Chen et al., "Active terahertz metamaterial devices," Nature, 444, 597-600 (2006) (4 pages).
W. L. Chan et al., "A spacial light modulator for terahertz beams," Appl. Phys. Lett. 94(21), 213511 (2009) (4 pages).
Seo M. et al., "Active terahertz nanoantennas based on VO2 phase transition," Nano Letters, 10, 2064-2068 (2010) (5 pages).
H. T. Chen et al., "Electronic control of extraordinary terahertz transmission through subwavelength metal hole arrays," Opt. Express 16, 7641-7648 (2008) (8 pages).
E. Hendry et al., "Ultrafast optical switching of the THz transmission through metallic subwavelength hole arrays," Physical Review B, 75, 235305 (2007) (5 pages).
Q. Xu et al., "12.5 Gbit/s carrier-injection based silicon micro-ring modulators," Opt. Express 15, 430-436 (2007) (7 pages).
F. J. Garcia-Vidal et al., "Light passing through subwavelength apertures," Reviews of Modern Physics, 82, 729-787 (2010) (59 pages).
F. J. Garcia-Vidal et al., "Transmission of Light through a Single Rectangular Hole," Phys. Rev. Lett. 95, 103901 (2005) (4 pages).
X. Xiao et al., "Resonant terahertz transmissions through metal hole array on silicon substrate," Optics Express. 18, 18558-18564 (2010) (7 pages).
H. Cao et al., "Influence of aperture shape on the transmission properties of a periodic array of subwavelength apertures," Optics Express. 12, 3664-3672 (2004) (9 pages).
Y. M. Bahk et al., "Influence Anomalous Band Formation in Arrays of Terahertz Nanoresonators," Phys. Rev. Lett. 106, 013902 (2011) (4 pages).

* cited by examiner

DEVICE AND METHOD FOR MODULATING TRANSMISSION OF TERAHERTZ WAVES

CROSS-REFERENCE TO RELATED APPLICATIONS

This application is a National Stage Application of International Application No. PCT/US2012/036289, filed on May 3, 2012, which claims priority under 35 U.S.C. §119(e) to U.S. Provisional Application No. 61/482,026, filed on May 3, 2011. Both PCT/US2012/036289 and U.S. Provisional Application No. 61/482,026 are incorporated herein by reference in their entirety.

BACKGROUND

The chart shown in FIG. 1 illustrates a particularly important portion of the electromagnetic spectrum, from the point of view of technological utility. At the low-frequency (long wavelength) end of the spectrum are radio and microwaves and at the high-frequency end (short wavelength) are infrared and visible light waves. Technological advancement based on the exploitation of both the low and high-frequency ranges of the electromagnetic spectrum has, to date, been widespread. For example, much of the presently existing wireless communication infrastructure is composed of electronic devices used to generate and modulate carrier waves in the radio/microwave portions of the spectrum. Following closely on the heels of developments in radio/microwave technology were developments in photonics and optical communications technology, which soon led to high-speed devices that employ much higher frequency carrier waves in the optical (infrared and visible) portions of the spectrum.

The region of the electromagnetic spectrum that connects the relatively low frequency microwaves to the relatively high frequency optical waves, the so-called terahertz regime, has been the latest to develop technologically, mainly due to the challenge of creating systems that may reliably generate and detect terahertz radiation. Nevertheless, the terahertz spectrum remains important for many reasons. For example, illicit drugs, explosives, and foam insulation defects all possess characteristic spectral responses in the terahertz range. In addition, the collective modes of soft condensed matter systems fall in the terahertz range, as do many molecular rotational and ro-vibrational modes. Thus, terahertz systems may be employed for trace gas sensing, food examination, package inspection, quality control, and medical imaging.

Advances in technology and applications continuously drive the demand for novel terahertz devices. For example, as communication systems press for more and more bandwidth to be used for high-speed data transmission, the demand for devices that can generate, detect, and manipulate terahertz radiation also increases. Furthermore, non-invasive and/or low health risk imaging techniques for the medical and security fields are always of great interest. To accomplish these ends, new devices that can directly manipulate terahertz radiation are needed as the foundational components of any technology that seeks to exploit electromagnetic radiation in the terahertz regime.

SUMMARY

In general, in one aspect, one or more embodiments of the invention are directed to a device. The device includes a metal layer including a first metal portion and a second metal portion. The first metal portion and the second metal portion are separated by an aperture. The first metal portion and the second metal portion are not directly connected in the metal layer. The device further includes a semiconductor layer affixed to a bottom surface of the metal layer. The semiconductor layer includes a carrier region located below the aperture. The transmission of terahertz waves through the aperture is modulated by changing a voltage applied across the aperture.

In general, in one aspect, one or more embodiments of the invention are directed to a device. The device includes a metal layer including a first metal region, a second metal region, and a third metal region. The first metal region and the second metal region are separated by a first aperture in the metal layer. Furthermore, the first metal region and the third metal region are separated by a second aperture in the metal layer. In the device, the first metal region, the second metal region, and the third metal region are not directly connected in the metal layer. The device further includes a semiconductor layer affixed to a bottom surface of the metal layer. The semiconductor layer further comprises a first carrier region located below the first aperture and a second carrier region located below the second aperture. The transmission of terahertz waves through the first aperture is modulated by changing a voltage applied across the first aperture, and the transmission of terahertz waves through the second aperture is modulated by changing a voltage applied across the second aperture.

In general, in one aspect, one or more embodiments of the invention are directed to a method for modulating transmission of terahertz waves. The method includes modulating a voltage across a ring-shaped aperture. The ring-shaped aperture is formed in a metal layer including a first region and a second region. The ring-shaped aperture separates the first region and the second region in the metal layer. A semiconductor is attached to a bottom surface of the metal layer and wherein a non-doped region of the semiconductor is located below the ring-shaped aperture. The method further includes detecting terahertz waves that are transmitted through the ring-shaped aperture.

In general, in one aspect, one or more embodiments of the invention are directed a device. The device includes a first terahertz modulator and a second terahertz modulator. The first terahertz modulator includes a first modulator metal layer, a first modulator semiconductor layer, and a plurality of first modulator island metal layers. In the first terahertz modulator, the first modulator metal layer and the plurality of first modulator island metal layers are separated by a plurality of ring-shaped apertures. Furthermore, the first terahertz modulator includes a plurality of carrier regions within the first modulator semiconductor layer. The plurality of carrier regions are disposed under the plurality of ring-shaped apertures. The transmission of terahertz waves through the plurality of ring-shaped apertures of the first terahertz modulator is modulated by changing a first voltage applied between the first modulator metal layer and the plurality of first modulator island metal layers.

The second terahertz modulator includes a second modulator metal layer, a second modulator semiconductor layer, and a plurality of second modulator island metal layers. In the second terahertz modulator, the second modulator metal layer and the plurality of second modulator island metal layers are separated by a plurality of ring-shaped apertures. Furthermore, the second terahertz modulator includes a plurality of carrier regions within the second modulator semiconductor layer, wherein the plurality of carrier regions are disposed under the plurality of ring-shaped apertures. The transmission of terahertz waves through the plurality of ring-shaped apertures of the second terahertz modulator is modulated by changing a second voltage applied between the second modulator metal layer and the plurality of second modulator island metal layers.

The device further includes a first electrical interconnect electrically connected to the first terahertz modulator and configured to provide the first voltage, and a second electrical interconnect electrically connected to the second terahertz modulator and configured to provide the second voltage.

Other aspects of the invention will be apparent from the following description and the appended claims.

DETAILED DESCRIPTION

Figure 1:
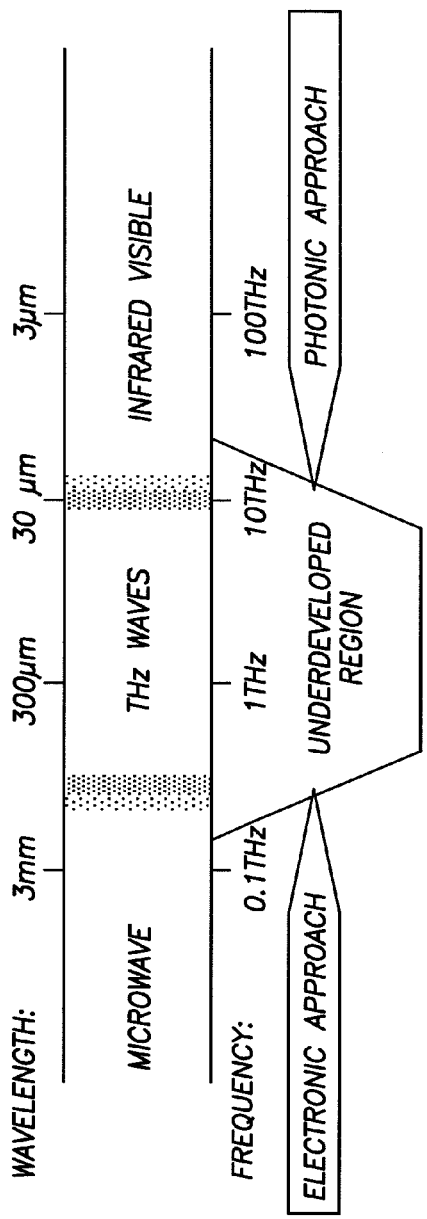
FIG. 1 is a chart showing the electromagnetic spectrum.

Specific embodiments of a device and method for modulating terahertz waves is described in detail with reference to the accompanying figures. Like elements in the various figures (also referred to as FIGs.) are denoted by like reference numerals for consistency.

In the following detailed description of embodiments, numerous specific details are set forth in order to provide a more thorough understanding of the device and method for modulating terahertz waves. However, it will be apparent to one of ordinary skill in the art that these embodiments may be practiced without these specific details. In other instances, well-known features have not been described in detail to avoid unnecessarily complicating the description.

In general, embodiments of the invention relate to a method and device for modulating terahertz waves. More specifically, embodiments of the invention relate to an aperture array that allows for extraordinary terahertz transmission (ETT) therethrough. Further, one embodiment of the method and device for modulating terahertz waves includes a structure and method for switching on and off ETT through the aperture array by modulating a voltage applied to a semiconductor layer located beneath the aperture array, thereby modulating a carrier density in a region beneath the individual apertures of the aperture array. In other embodiments, an array of independently addressable aperture arrays (i.e., an array of aperture arrays) operates as a spatial "light" modulator for terahertz beams. In accordance with one or more embodiments of the invention, the terahertz modulator may be employed in a terahertz based communication system. Further, in accordance with one or more embodiments of the invention, the spatial light modulator for terahertz beams may be employed in a single pixel camera as a component in a compressed sensing system.

Figure 2:
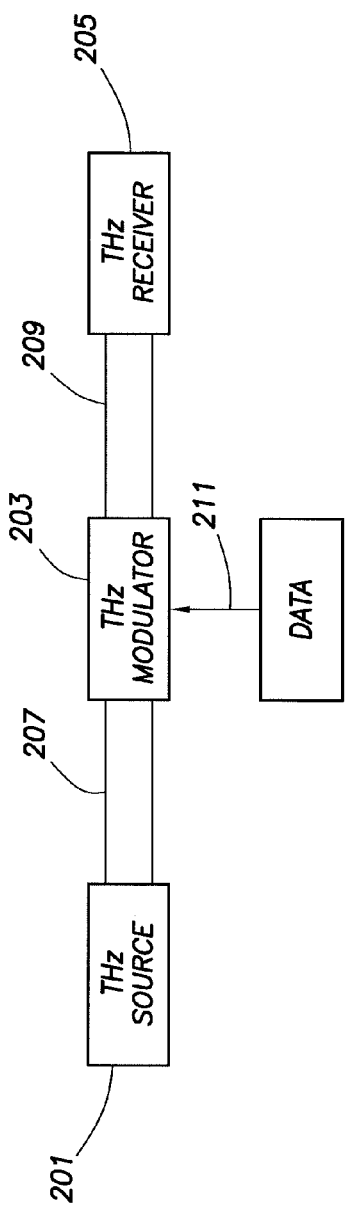
FIG. 2 shows a communication system employing a terahertz modulator in accordance with one or more embodiments of the invention.

FIG. 2 shows a terahertz based communication system in accordance with one or more embodiments of the invention. The terahertz communication system includes a terahertz source 201 (e.g., a broadband short-pulse terahertz source such as a photoconductive antenna driven by a femtosecond laser, a narrowband terahertz source such as a gas laser, a quantum cascade laser, a backwards wave oscillator, etc.), a terahertz modulator 203 and a terahertz receiver 205 (e.g., a heterodyne receiver based on GaAs Schottky diodes such as antenna coupled Schottky diodes, a nonlinear transmission line, a diode system based on metal-oxide metal diodes, etc.). As used herein, a terahertz source is any device (or component) that emits terahertz radiation, i.e., electromagnetic waves having a frequency range within about 0.1 THz-20 THz. As one of ordinary skill will appreciate, the terahertz source may be a continuous wave (CW) source or a pulsed source. Further, the terahertz source may be monochromatic or broadband. Furthermore, as used herein, a terahertz receiver is any device (or component) that senses terahertz radiation and converts the sensed terahertz radiation into an electrical signal (i.e., voltage and/or current). In accordance with one or more embodiments of the invention, the terahertz modulator 203 is an aperture array (not shown) having ETT that is switched by free carrier injection, as described in more detail below, with reference to FIGS. 6A-6B, FIGS. 7A-7C, and FIGS. 10A-10C. In accordance with one or more embodiments of the invention, the terahertz wave 207 emitted from terahertz source 201 passes through terahertz modulator 203. The transmission coefficient of terahertz modulator 203 is modulated to create an amplitude modulated terahertz wave 209 that exits from the terahertz modulator 203. Accordingly, data 211 is encoded onto the terahertz wave 207 as terahertz wave 207 passes through terahertz modulator 203. As one of ordinary skill in the art will appreciate, amplitude modulation is one method used to encode data onto a carrier wave. According to the amplitude modulation method, the encoded data value corresponds to the average amplitude of the carrier wave taken over any number of cycles. Thus, data 211 may be encoded onto the amplitude of terahertz wave 207 by varying the transmission coefficient of terahertz modulator 203 in a way that corresponds to the incoming data. One of ordinary skill having the benefit of this disclosure will appreciate that the terahertz modulator 203 may be used for digital and/or analog amplitude modulation. Amplitude modulated terahertz wave 209 is then detected by the terahertz receiver 205 and the amplitude modulated signal 213 detected by terahertz receiver 205 is decoded by demodulation unit 215 to create recovered data 211.

Figure 3A:
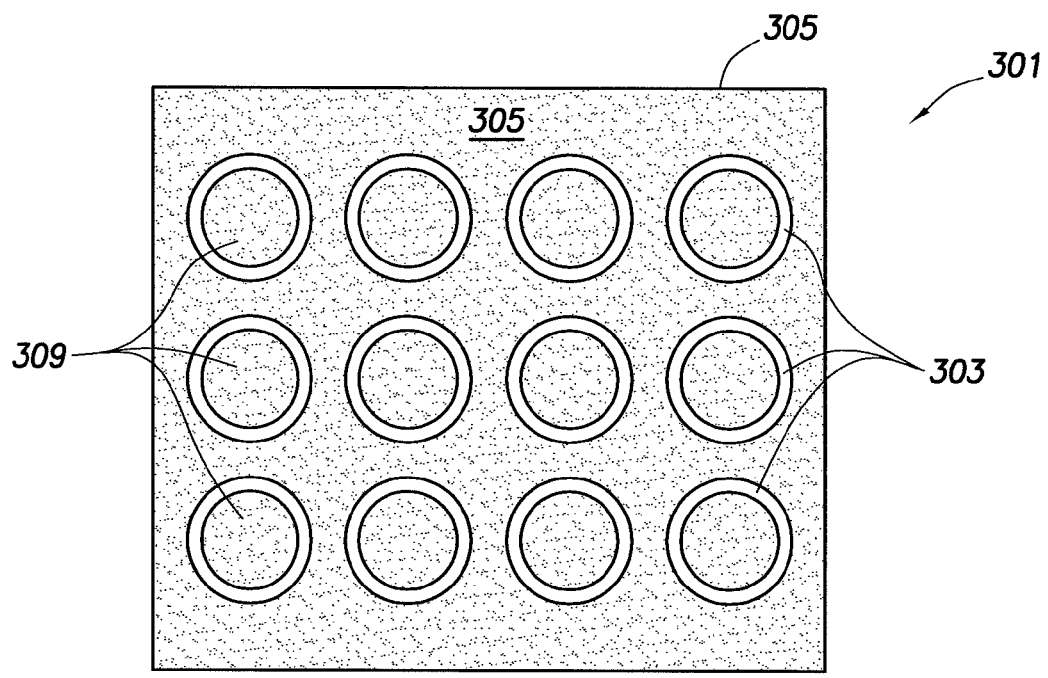
FIGS. 3A-3B show top views of terahertz modulators in accordance with one or more embodiments of the invention.
Figure 3B:
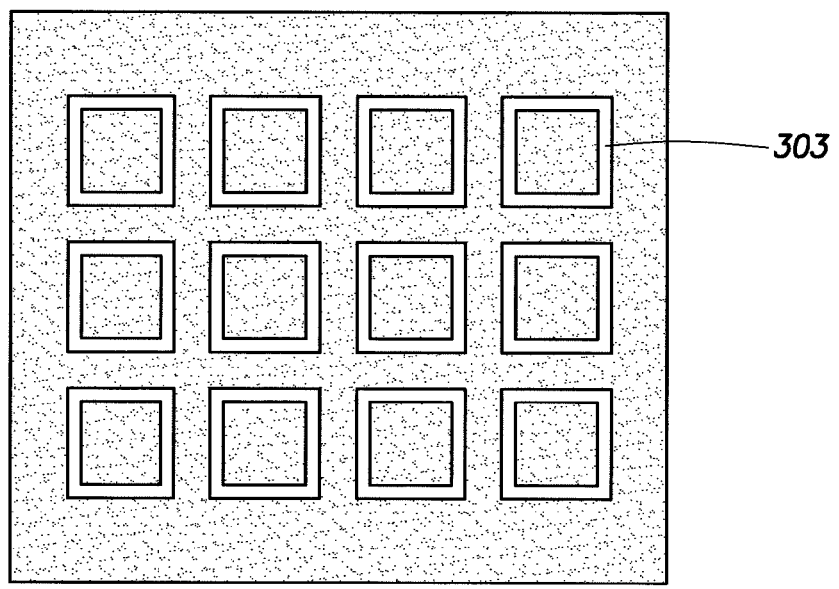

FIGS. 3A-3B show examples of top views of terahertz modulators in accordance with one or more embodiments of the invention. Terahertz modulator 301 includes an array of circular ring-shaped apertures 303 formed within metal film 305. In accordance with one or more embodiments, the metal film 305 may be deposited on a semiconductor surface (not shown) that allows the modulation of the free carrier density below the apertures 303. By modulating the free carrier density below the apertures 303, the ETT effect may be turned on/or off, thus, resulting in a modulator 301 that has either a very high or very low transmission coefficient. The modulation of the carrier density in the layer below the apertures 303 is accomplished by modulating the relative voltage between the continuous portion 307 of metal film 305 and the island portions 309 of the metal film 305 as described in further detail below.

FIG. 3B illustrates another example in accordance with one or more embodiments of the invention. In FIG. 3B, the apertures 303 may be of square ring shape rather than circular ring shape. Indeed, one of ordinary skill will appreciate that many different geometries may be employed without departing from the scope of the present disclosure, e.g., rectangular, oval, polygonal, or the like. Further, while each aperture 303 in the array of apertures is shown to have the same shape and size, one of ordinary skill having the benefit of this disclosure will appreciate that arrays having non-uniform size and/or shape may be used to tailor the frequency response (i.e., resonant frequency and or resonance width) of the terahertz modulator to a particular application.

Figure 4A:
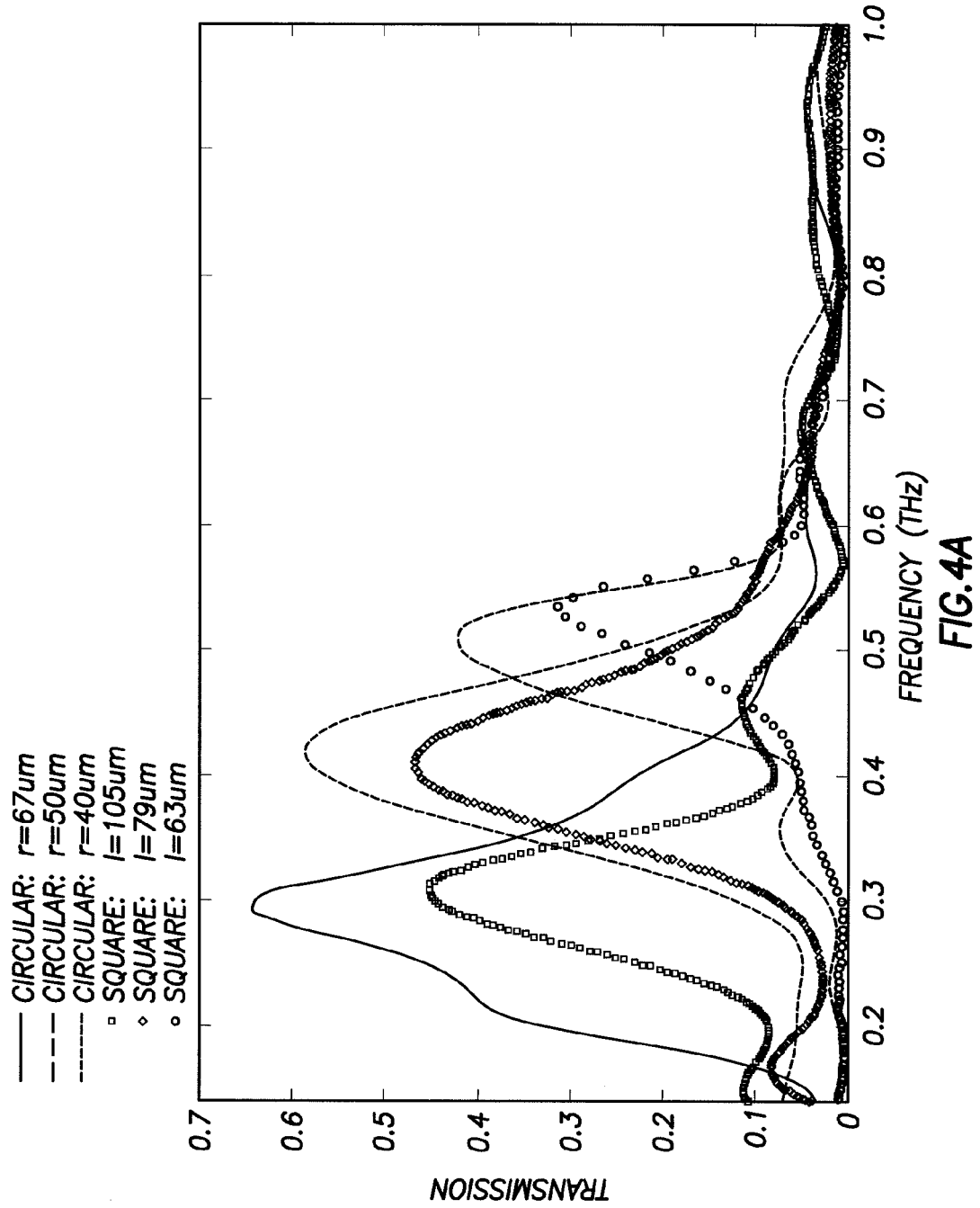
FIG. 4A shows a plot of transmission versus wavelength, illustrating the concept of extraordinary terahertz transmission (ETT) for an aperture array in accordance with one or more embodiments of the invention.
Figure 4C:
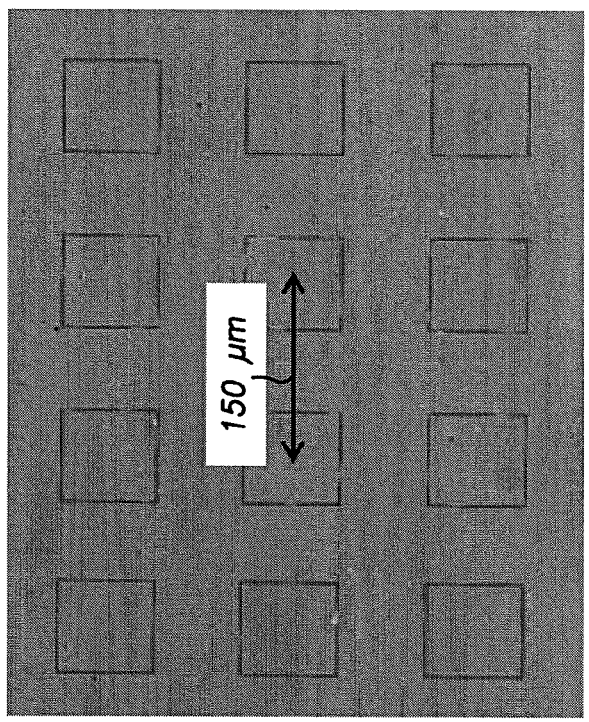
FIGS. 4B-4C show scanning electron microscope (SEM) images of a portion of the aperture arrays used to measure the spectra shown in FIG. 4A.
Figure 4B:
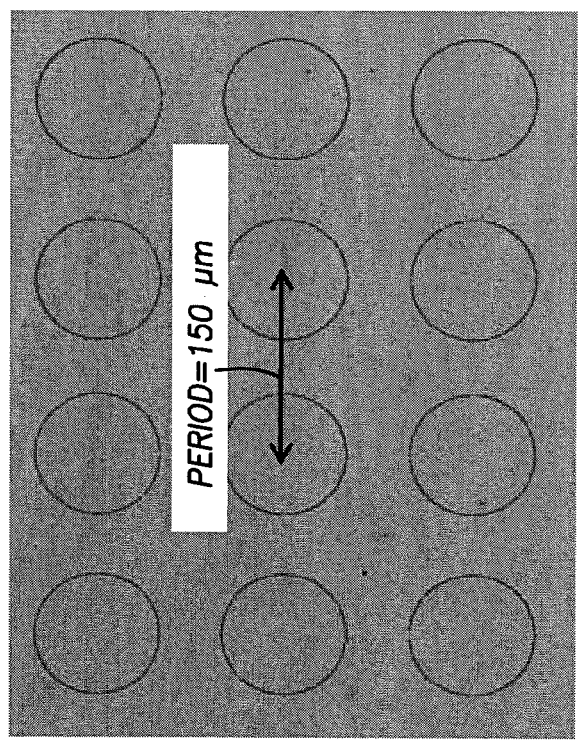

FIG. 4A shows a plot of measured transmission through a terahertz modulator in accordance with one or more embodiments of the invention. Specifically, the resonant spectral response of the modulator illustrates the concept of ETT for an aperture array in accordance with one or more embodiments of the invention. More specifically, the plot shows the measured spectra for terahertz modulators that employ either circular-ring-shaped apertures or square-ring-shaped apertures. FIGS. 4B and 4C show scanning electron microscope (SEM) images of a portion of the aperture arrays used for the spectral measurements shown in FIG. 4A. The period (center-to-center distance as shown) of both arrays is p=150 μm. Furthermore, the metal layer for the devices shown in FIGS. 4A-C is formed from gold having a thickness of 100 nm. However, any metallic layer may be used, e.g., aluminum, copper, or the like without departing from the scope of the invention. For FIG. 4B, the circular ring aperture width is 1 μm while the radius of a ring is 50 μm. For FIG. 4C, the square ring aperture width is 1 μm while the length of a side of the square is 79 μm. Furthermore, the total size of each array is 4.8 mm×4.8 mm. As can be seen in the FIGS. 4B and 4C, the open fraction of the devices, i.e., the fraction of device area that is composed of open apertures is only 1%-2%. However, for certain frequencies, the transmission of terahertz radiation through the device is on the order of 60%. This large discrepancy between the open area of the device and the fraction of terahertz radiation that is transmitted through the device is the phenomenological essence of ETT. The modulators shown in FIG. 4B and FIG. 4C are meant only as examples, and, thus, the particular dimensions reported above may vary depending on the design requirements of the modulator. For example, the aperture width may vary depending on the architecture of the device, e.g., in accordance with one or more embodiments of the invention, a modulator may employ an aperture having a width in the range of 0.1-5 μm. In other embodiments, the width may fall outside of the range of 0.1-5 μm.

The physics of ETT is based on the fact that the length scale of the apertures is smaller than the wavelength of the terahertz waves. Accordingly, models based on ray optics are not sufficient to understand the phenomena. Rather, ETT through narrow apertures is due to a significantly enhanced electric field inside and around the aperture. Because of the strong local field, the ETT effect is highly sensitive to the change in material properties around the aperture. For example, for the devices shown in FIG. 4B-4C, the peak transmission through the device is determined by the large difference in refractive index between the air on top of the film (i.e., on the side where the terahertz beam is incident on the device) and silicon beneath the metal film. The peak transmission may be close to 100% when the relative refractive indices on both sides of the metal film are the same. Varying the width of the aperture between 20 μm and 1 μm, or varying the thickness of the metal layer between 2 μm and 100 nm, only results in small changes (<6%) in the peak transmission through the device.

Figure 5B:
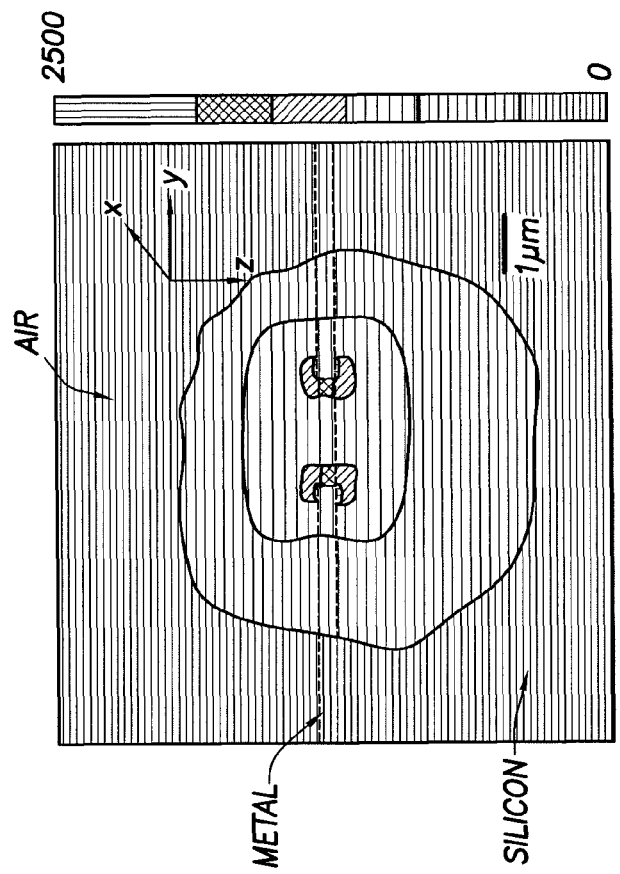
FIG. 5A-5B show simulated electric field distributions from a ring aperture in accordance with one or more embodiments of the invention.
Figure 5A:
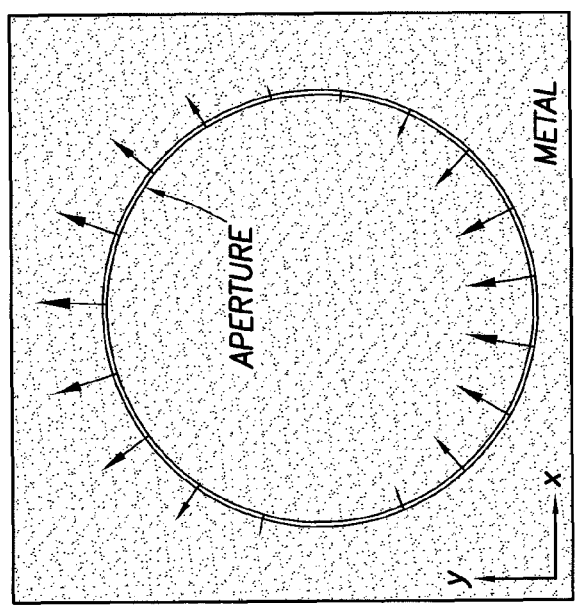

To further illustrate the principle of ETT through a circular ring array in accordance with one or more embodiments of the invention, the electric field (E-field) amplitude of the transverse electric-1,1 ($TE_{11}$) mode of a ring aperture with a radius r=50 μm is shown in FIG. 5A, for the case of a plane wave terahertz beam normally incident on the device. As used herein, normal incidence refers to a wave whose propagation direction is perpendicular (i.e., normal) to the device substrate. The phase of the radial component $E_r$ of the mode varies by $2\pi$ over the circumference of the ring, as can be seen by the arrows representing the instantaneous amplitude of $E_r$ around the ring. The $TE_{11}$ mode has a cut-off frequency of $f_c = c/2\pi\, r\, n_{eff}$), where $n_{eff}$ is the effective index and r is the radius of the ring. At $f_c$, there is no phase variation in the direction perpendicular to the substrate, creating a Fabry-Perot (FP) resonance inside the aperture, which results in the ETT effect. The arrows in FIG. 5A show the direction of the E-field of the y-polarized $TE_{11}$ mode. One can see that the E-field at upper and lower halves of the ring both point to the +y direction; therefore, this mode will efficiently couple to a y-polarized normal-incidence plane wave. The degenerate x-polarized $TE_{11}$ mode of the aperture provides ETT for the x-polarized normal-incident wave, resulting in polarization-independent operation of the device. FIG. 5B shows an intensity plot of a side view of the E-field intensity distribution when a plane wave passes through the ring aperture. The E-field distribution is highly confined in and around the aperture, with the peak E-field average intensity ($|E|^2$) in the aperture enhanced by a factor of 2500 relative to the incident wave.

Figure 6A:
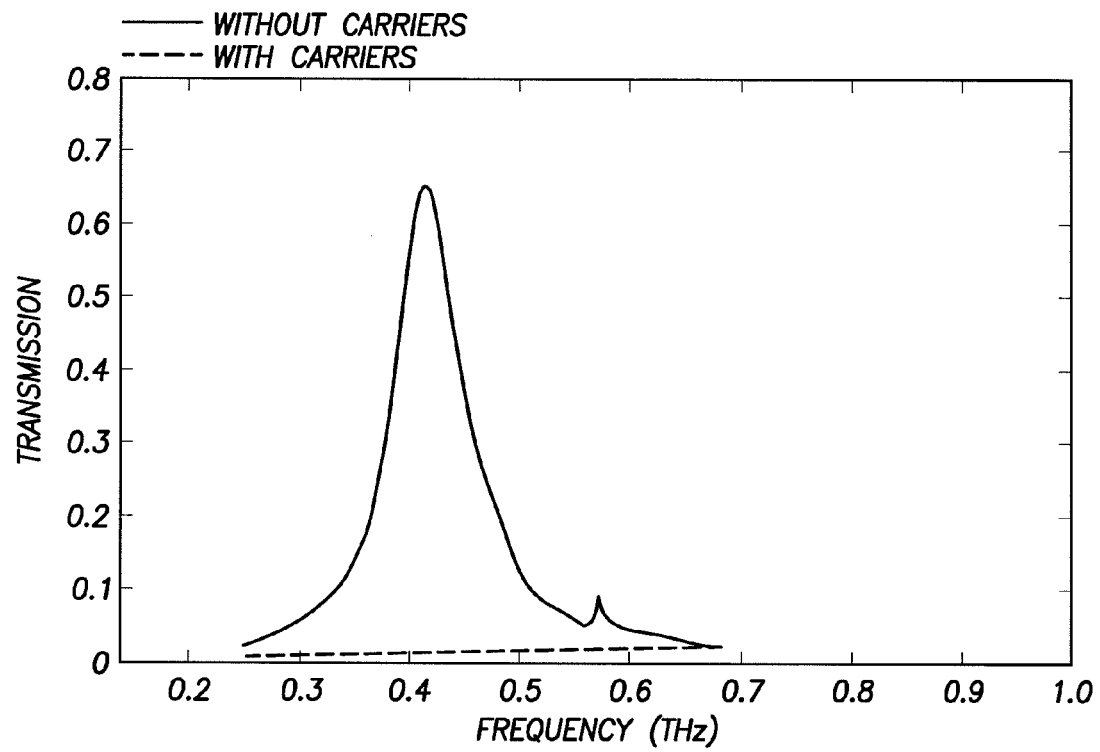
FIG. 6A shows a plot of simulated transmission versus wavelength for a terahertz modulator in accordance with one or more embodiments of the invention.
Figure 6B:
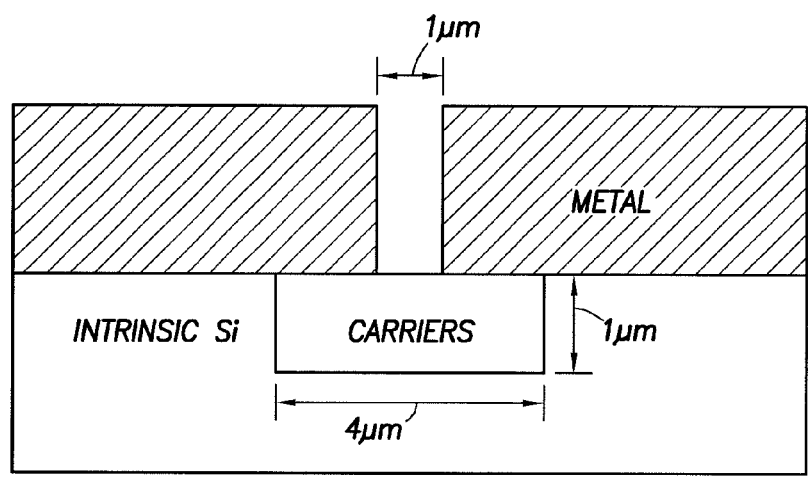
FIG. 6B shows a cross-sectional view of a terahertz modulator in accordance with one or more embodiments of the invention.

In accordance with one or more embodiments of the invention, as shown in FIGS. 6A-6B, the ETT effect may be switched off by injecting free carriers into semiconductor layer underneath the apertures. A small increase in free-carrier absorption is significantly enhanced by the FP resonance, resulting in a substantial decrease in transmission. The dashed line in FIG. 6A shows a transmission spectrum obtained by way of a 3D Finite-difference time-domain (FDTD) simulation when free carriers with a density of $3\times10^{17}$ $cm^{-3}$ are injected into a 1-μm-deep and 4-μm-wide region of intrinsic silicon under the ring aperture. This density of free carriers gives rise to a local conductivity of approximately 10 $\Omega^{-1}$ $cm^{-1}$. A cross-sectional view of a device having a region injected with free carriers is shown in FIG. 6B. The injected carriers cause the transmission of the aperture to drop as much as 17 dB, while the one-pass absorption of the free carriers is only about 0.6 dB.

Figure 7A:
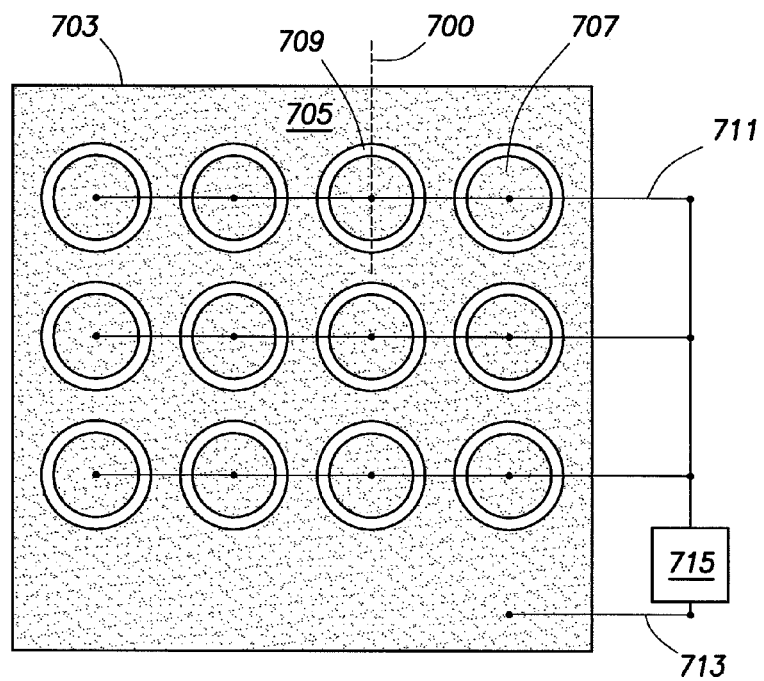
FIGS. 7A-7D show different views of terahertz modulators in accordance with one or more embodiments of the invention.
Figure 7B:
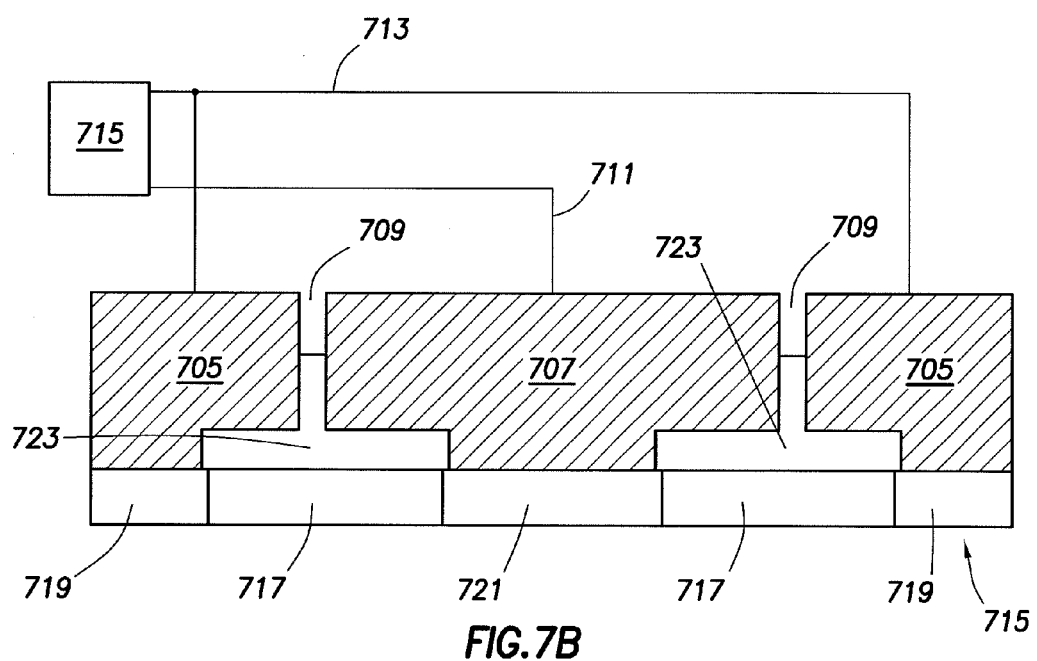
Figure 7C:
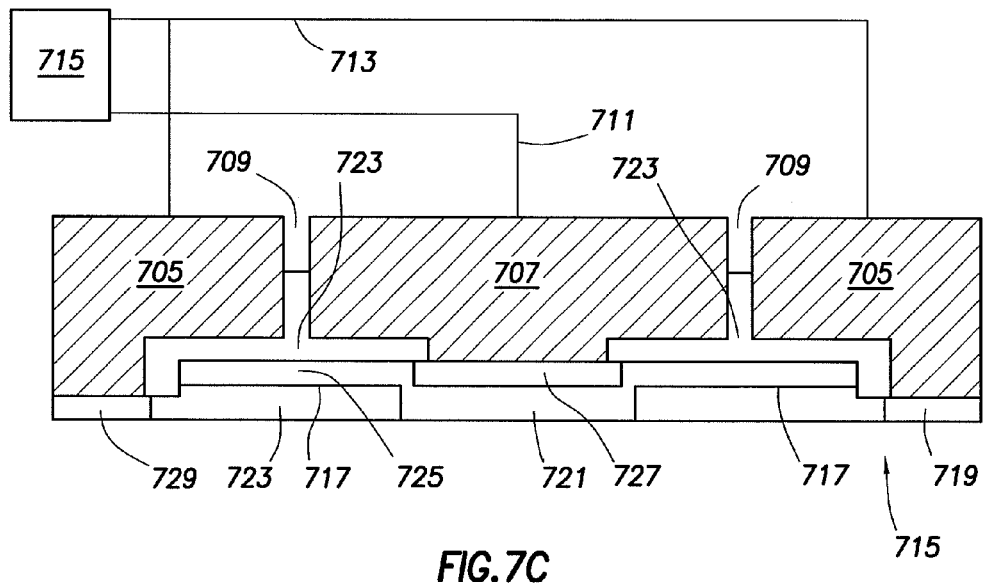

FIGS. 7A-7C show several different views of a terahertz modulator that employs controllable free carrier injection in accordance with one or more embodiments of the invention. Turning to the top view of the terahertz modulator shown in FIG. 7A, the modulator includes metal layer 703 that is divided into portions. Metal layer 703 includes continuous portion 705 and island portions 707. The island portions are separated from the continuous potion by way of the apertures 709. Thus, the continuous portion 705 and the island portions 707 are not directly connected. Interconnects 711, which may be formed of metal wires, or the like, electrically connect together the island portions 707, as shown. Furthermore, interconnect 713 is connected to the continuous portion 705. Accordingly, a bias voltage from voltage source 715 may be used to electrically bias the island portions 707 relative to the continuous portion 705. In accordance with one or more embodiments (not shown), interconnect 711 may individually address each island portion, thereby allowing for each island portion to be biased differently from each other bias portion. Accordingly, each island portion may be biased by a separate voltage source (not shown).

FIG. 7B shows a cross-section taken along line 700 of the terahertz modulator in accordance with one or more embodiments of the invention. For simplicity, the cross-section of a single ring aperture is shown to further illustrate an architecture of the device in accordance with one or more embodiments of the invention. Located beneath the metal layer island portion 707 and continuous portion 705 is semiconductor layer 715. Semiconductor layer 715 further includes carrier region 717, which may be formed of intrinsic silicon, or the like. Carrier region 717 is located directly below aperture 709 and is interposed between p-doped region 719 and n-doped region 721. Accordingly, carrier region 717, p-doped region 719, and n-doped region 721 form a P-I-N junction, with insulating layer 723 disposed directly above the carrier region 717. Continuous layer portion 705 is electrically connected to p-doped region 719. Furthermore, island layer portion 707 is electrically connected to the n-doped region 721. In accordance with one or more embodiments of the invention, one, or both, of p-doped region 719 and n-doped region 721 may be highly doped to ensure ohmic contact between the metal film portion and the semiconductor layer. Furthermore, in accordance with one or more embodiments of the invention, the insulating layer 723 may be formed from an oxide, e.g., $SiO_2$. As used herein, the term highly doped is used to describe an extrinsic semiconductor layer that has been doped to the extent that when the semiconductor layer is in contact with a metal layer, the junction may form a non-rectifying junction, i.e., a region in a semiconductor device that has a current-voltage (I-V) curve that is substantially linear and symmetric. One of ordinary skill will appreciate that the exact amount of doping to achieve a highly doped semiconductor may differ depending on the type of semiconductor and desired behavior of the contact.

In accordance with one or more embodiments of the invention, the free carrier density within carrier region 717 may be modified by applying a voltage across continuous layer portion 705 and island layer portion 707. Carrier region 717, p-doped region 719, and n-doped region 721 form a P-I-N junction and, thus, a forward biasing of the device (i.e., $V_P>V_N$, where $V_P$ is the voltage applied to the p-doped region 719 and $V_N$ is the voltage applied to the n-doped region 721) will result in an increase of the free carrier density in the carrier region 717. As illustrated in FIG. 6A, above, an increase in the free carrier density in the carrier region 717 has the effect of reducing the transmission of terahertz waves through the modulator. Accordingly, the amplitude of the terahertz wave may be modulated by switching the bias voltage applied across the P-I-N junction. In accordance with one or more embodiments of the invention, the carrier region may be formed from intrinsic, or underdoped, silicon, which generally has a low conductivity. Thus, when no voltage is applied across the device, the terahertz transmission is maximal. Alternatively, a low conductivity state may be accomplished by reverse biasing the device $V_P<V_N$. Conversely a high-attenuation, i.e., a high conductivity state within carrier region 717, state may be achieved by forward biasing the device to inject free carriers into the intrinsic silicon carrier region 717.

In accordance with one or more embodiments, the width of the carrier region 717 is much larger than the width of aperture 709. Thus, p-doped region 719 and n-doped region 721 are positioned a relatively large lateral distance away from the edges of aperture 709. Consequently, terahertz waves that are transmitted through the device while in the highly transmitting state will not extend into p-doped region 719 and n-doped region 721 and be inadvertently attenuated by free carriers in these regions. Furthermore, the use of a P-I-N junction, wherein the transmission of the terahertz waves is localized to the carrier region 721 provides for a higher modulation depth than would be possible under other configurations, e.g., a configuration relying on a hybrid metal-semiconductor Shottkey-diode type junction, because of the inherently low carrier density in the carrier region 721. One of ordinary skill will appreciate that many different types of semiconductor materials may be used for the P-I-N junction, e.g., silicon, group III-V semiconductors (GaAs, InP, or the like), grapheme, or the like. Furthermore, as one of ordinary skill will appreciate, the terahertz modulator may be manufactured according to known methods for fabricating semiconductor devices, e.g., through a complementary metal-oxide-semiconductor (CMOS) process, or the like.

FIG. 7C shows a cross-section taken along line 700 of the terahertz modulator in accordance with one or more embodiments of the invention. For simplicity, the cross-section of a single ring aperture is shown to further illustrate the architecture of the device. Located beneath the metal layer island portion 707 and continuous portion 705 is semiconductor layer 715. Semiconductor layer 715 further includes carrier region 717, which may be formed of p-doped region 723 and n-doped region 725, which form a P-N junction, or the like. Thus, the free carrier density in the carrier region 717 may be modulated by biasing the P-N junction. Continuous layer portion 705 is electrically connected to p-doped region 723 by way of highly p-doped ohmic contact region 729. Similarly, island metal layer portion 707 is electrically connected to the n-doped region 725 by way of highly n-doped ohmic contact region 727. In the contact region between n-doped region 725 and p-doped region 723, a depletion region will form that has a size that may be modified by applying a voltage across continuous layer portion 705 and island layer portion 705. Thus, by reverse biasing the P-N junction, carriers are removed from the P-N junction and the device is put into a high transmission state. Conversely, forward biasing, or even no bias, will result in a high attenuation state. Accordingly, the amplitude of the terahertz wave may be modulated by switching the bias voltage to the P-N junction. Many different types of semiconductor materials may be used for the P-N junction, e.g., silicon, group III-V semiconductors (GaAs, InP, or the like), grapheme, or the like, without departing from the scope of the present disclosure. Furthermore, the terahertz modulator may be manufactured according to known methods for fabricating semiconductor devices, e.g., through a complementary metal-oxide-semiconductor (CMOS) process, or the like.

Figure 7D:
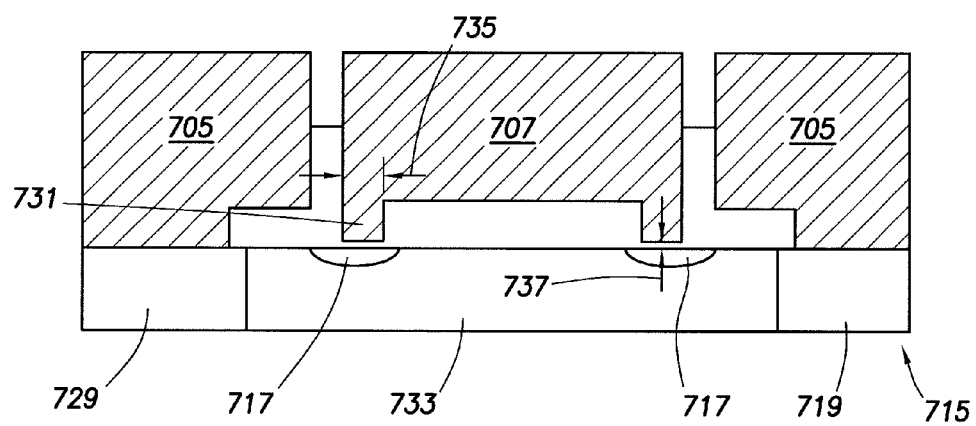

FIG. 7D shows a cross-section taken along line 713 of the terahertz modulator in accordance with one or more embodiments of the invention. For simplicity, the cross-section of a single ring aperture is shown to further illustrate an architecture of the device in accordance with one or more embodiments of the invention. Located beneath the metal layer island portion 707 and continuous metal layer portion 705 is semiconductor layer 715. Semiconductor layer 715 further includes high resistivity region 733, which may be formed of a high-resistivity material such as intrinsic or low doped silicon. Continuous layer portion 705 is electrically connected to the high-resistivity region 733 by way of highly p-doped (or highly n doped) ohmic contact region 729.

In accordance with one or more embodiments of the invention, the modulator may take the form of a metal-oxide-semiconductor (MOS) device, as shown in FIG. 7D. The island metal layer portion 707 is electrically isolated from both the continuous metal layer portion 705 and high resistivity region 733, by way of oxide layer 723, which may be formed from $SiO_2$, or the like. In addition, in accordance with one or more embodiments of the invention, the island metal layer portion 707 includes gate electrode portion 731. Accordingly, the gate electrode portion 731 of the island metal layer portion 707 serves as a MOS gate for the MOS structure that includes metal layer island portion 707, oxide layer 723, semiconductor layer 715, and continuous metal layer portion 705.

In accordance with one or more embodiments of the invention, for architectures that employ highly doped p+ regions 729 and 719, the high-resistivity region 733 may be formed from p− or intrinsic semiconductor material. In this configuration, when a negative voltage is applied to gate electrode portion 731, holes will accumulate in the carrier region 717. Thus, when the negative voltage is applied, the modulator is in a low transmission state because the free carriers (holes) absorb the terahertz wave. In contrast, when the voltage on the gate is 0, the transmission through the modulator is high. However, for architectures that employ highly doped n+ regions 729 and 719, the high-resistivity region 733 may be formed from n− or intrinsic semiconductor material. When a positive voltage is applied to gate electrode portion 731, electrons will accumulate in the carrier region 717. Thus, when the positive voltage is applied, the modulator is in a low transmission state because the free carriers (electrons) absorb the terahertz wave. In contrast, when the voltage on the gate is 0, the transmission through the modulator is high.

In accordance with one or more embodiments, the MOS architecture may be implemented by setting the width 735 of gate electrode portion 731 to be near the range of 0.2-2 µm. In addition, the thickness 737 of the oxide layer 723 directly beneath the gate electrode portion 731 may be 1-10 nm One of ordinary skill will appreciate that these precise widths may be adjusted depending on the types of materials used and voltages being applied.

Figure 8:
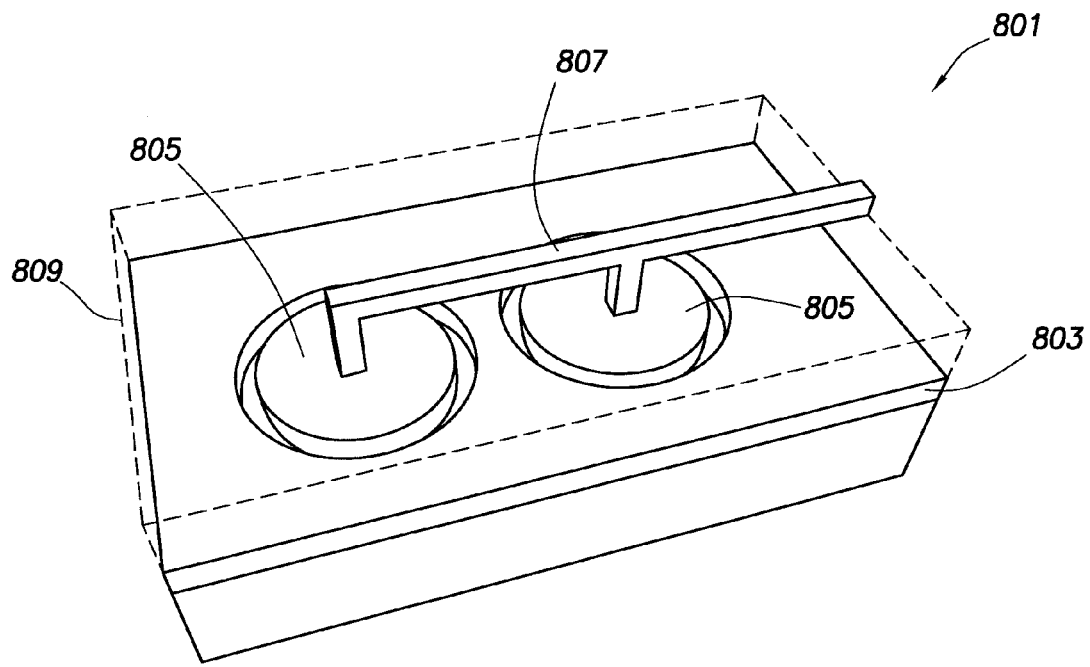
FIG. 8 shows a portion of a terahertz modulator in accordance with one or more embodiments of the invention.

FIG. 8 shows an example of a portion of a modulator in accordance with one or more embodiments of the invention. Similar to the embodiments described above, the modulator 801 includes a metal layer 803, having a ring aperture formed therein. Accordingly the metal layer inside and outside the ring are electrically isolated and can be used as two electrodes, as described above. In the embodiment shown in FIG. 8, the island portion layers 805 may be connected by a metal wire bridge 807 to form one electrode. Furthermore, the metal wire bridge 807 may be supported by a insulating layer 809 interposed between metal wire bridge 807 and metal layer 803.

Figure 9A:
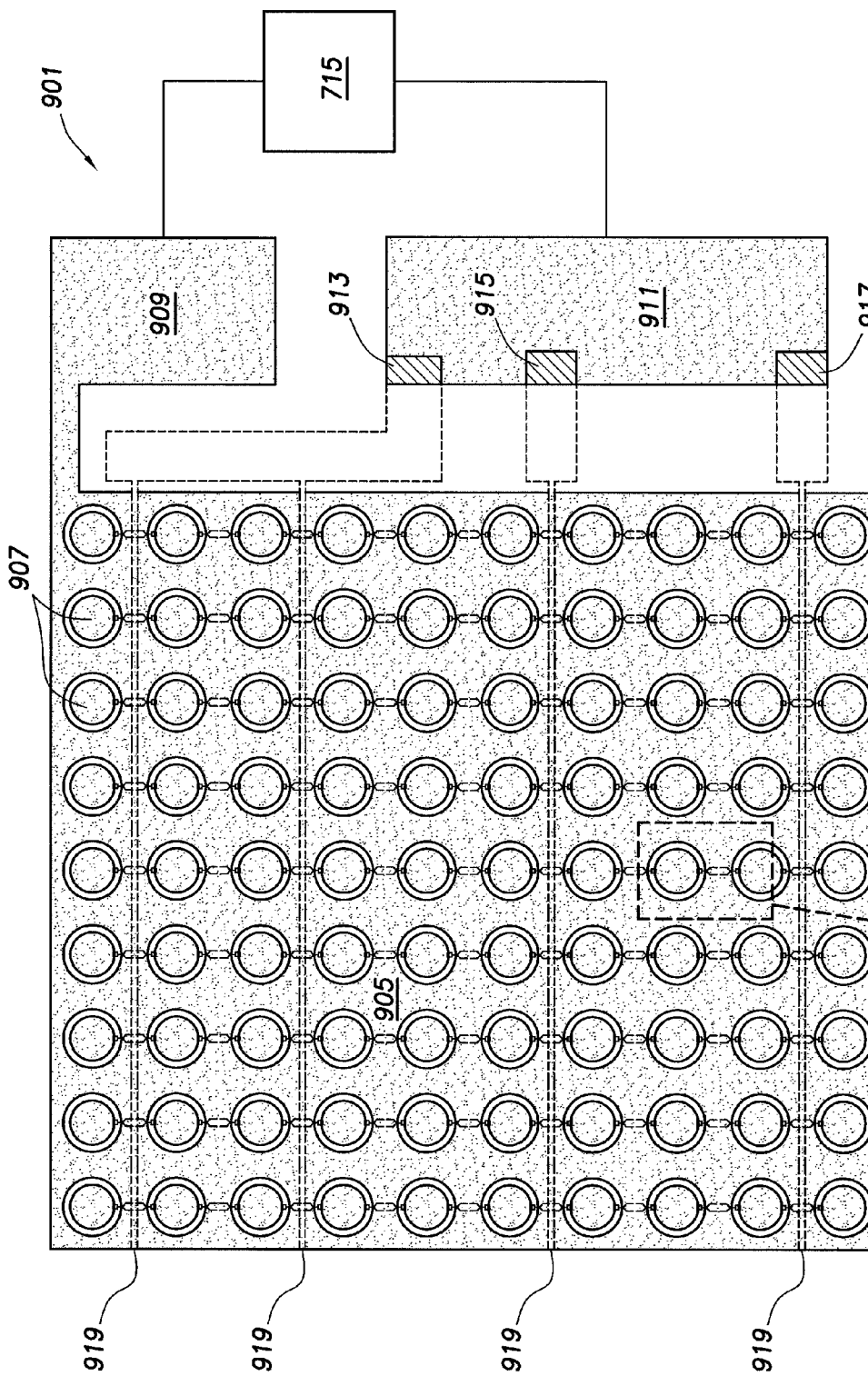
FIGS. 9A-9D show different views of a terahertz modulator in accordance with one or more embodiments of the invention.
Figure 9B:
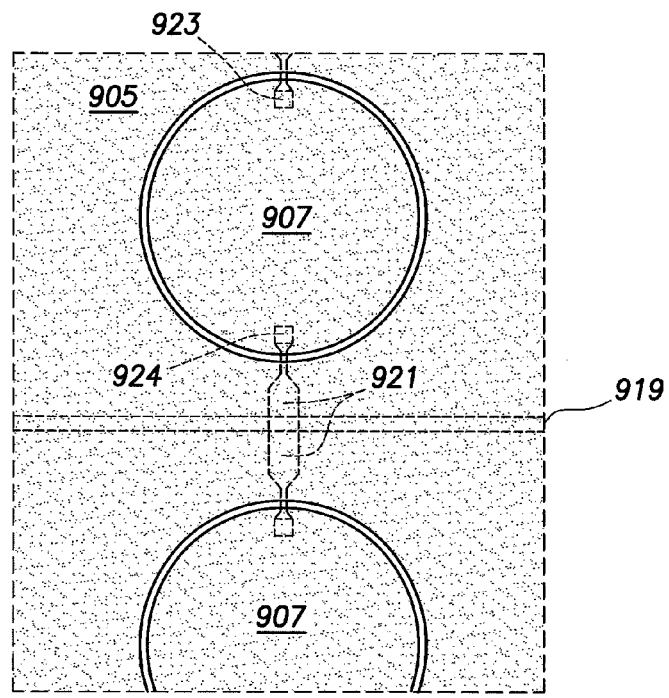

FIGS. 9A-9B show a terahertz modulator in accordance with one or more embodiments of the invention. More specifically, the modulator 901 shown in FIGS. 9A-9B includes an array of circular ring apertures with multiple interconnect lines for biasing the two metal layer portions, the continuous layer portion 905 and the island layer portions 907. For simplicity only two of the island layer portions 907 are labeled in FIG. 9A, even though FIG. 9A shows more than 90 island layer portions 907. In accordance with one or more embodiments of the invention, the continuous layer potion 905 is electrically connected by way of pad 909 formed in the top metal layer of the device. In addition, the island layer portions 907 are connected by way of pad 911 also formed in the top metal layer of the device. Vias, 913, 915, and 917 pass through the device to a lower metal layer of the device where the electrical connections to the island layer portions 907 are made. As used herein, the term via is used to describe a conductor filled hole that passes through different layers in a multi-layer electronic device and, thus, allows for the electrical connections of components that may reside in separate layers of a multi-layer device. Specifically, formed in the lower metal layer of the modulator are a plurality of metal wires 919 that electrically connect the island layer portions 907 together. More specifically, as shown in the inset view of FIG. 9B, the metal wires 919 include spine portions 921 that extend in an outward direction from the metal wires 919 and terminate just inside and below the island layer portions 907. The island layer portions 907 themselves are connected to the spine potions 921 by way of vias 923 and 924.

Figure 9C:
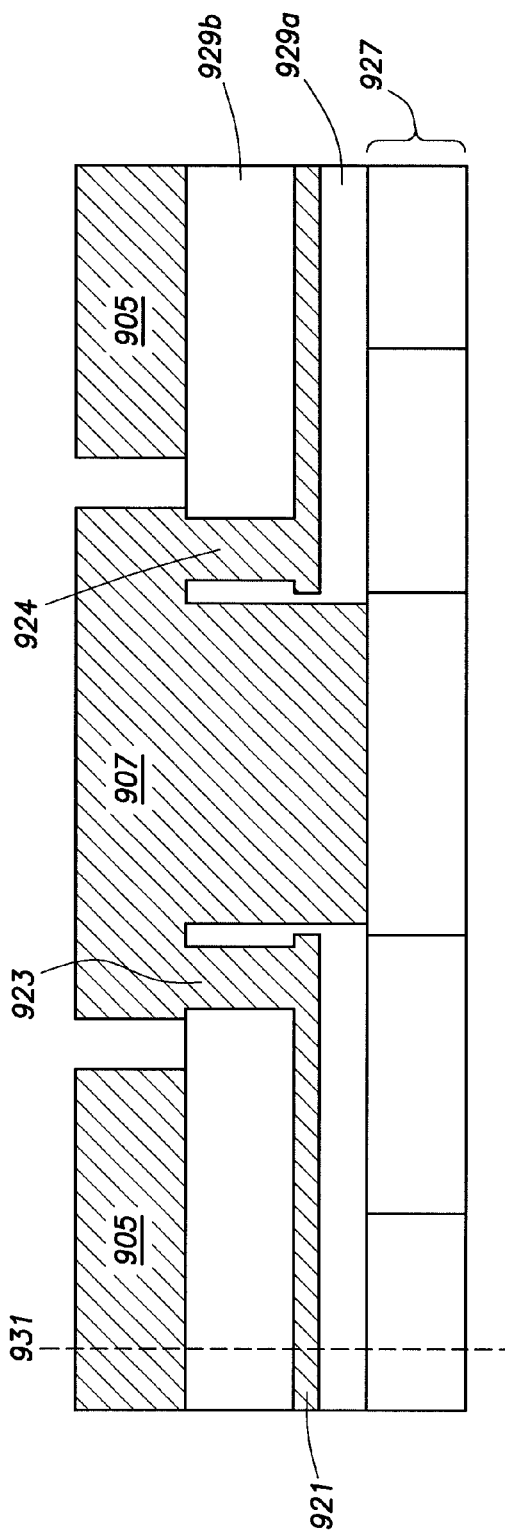
Figure 9D:
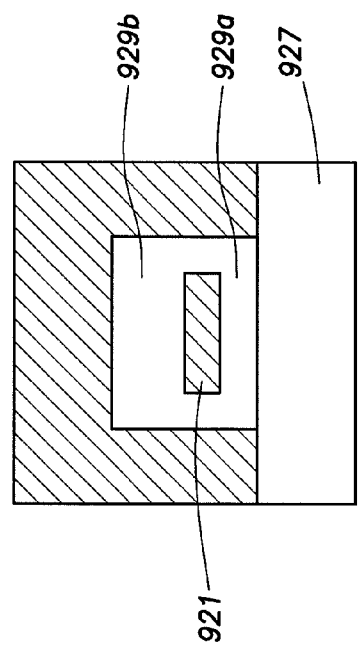

FIG. 9C shows a cross-sectional view of a terahertz modulator shown in FIGS. 9A and 9B. In accordance with one or more embodiments, the spine portion 921 may be formed in a lower metal layer and may therefore pass underneath the continuous layer portion 905 as shown. Furthermore, in accordance with one or more embodiments of the invention, the spine portion 921 may be located between insulating layer 929a and insulating layer 929b, wherein insulating layer 929a is formed on top of semiconductor layer 927. Accordingly, insulating layers 925a and 925b serve to support the spine portion 921 within the layer structure of the modulator. Thus, spine portion 921 is electrically isolated from both the outer region of the semiconductor layer 927 and the continuous layer portion 905, as shown in FIG. 9D, taken through line 931. Accordingly, the architecture shown in FIG. 9C allows for the spine portion 921 to be formed from a lower metal layer of the device and to connect the island layer portions 907 to the spine potions 921 by way of vias 923 and 924.

Many different variations of the precise design of the terahertz modulator are possible without departing from the scope of the present disclosure. Accordingly, the examples shown in FIGS. 8-9C are not meant to limit the scope of the present invention, but, rather merely to provide two examples for how the electrical interconnections may be made.

Figure 10A:
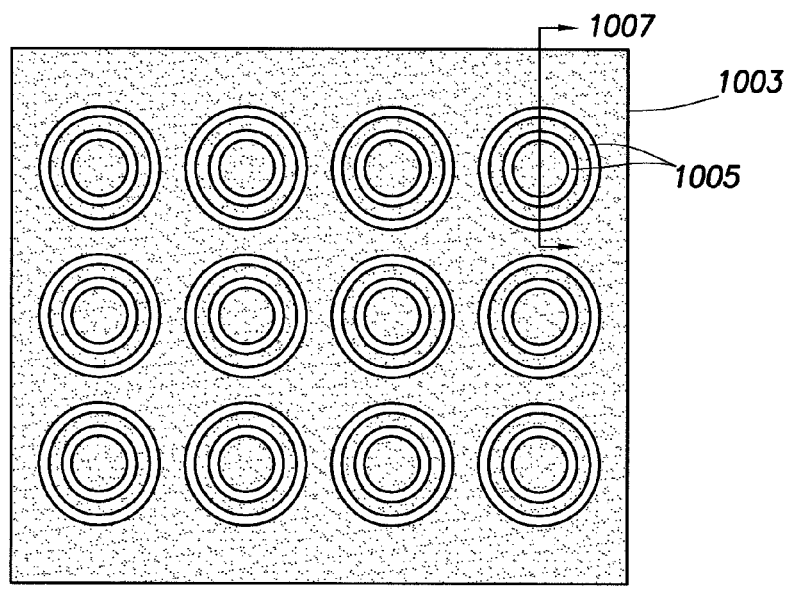
FIG. 10A-10D show different views of a terahertz modulator in accordance with one or more embodiments of the invention.

As alluded to above, many different shapes and configurations of aperture arrays may be used without departing from the scope of the present disclosure. For example, FIG. 10A shows a split or concentric ring configuration for each aperture. More specifically, the metal layer 1003 includes a plurality of concentric ring apertures 1005. Forming the ring apertures as concentric rings results in dramatically different transmission properties from a single ring design, as described in further detail below, in reference to FIGS. 11A-11D.

Figure 10B:
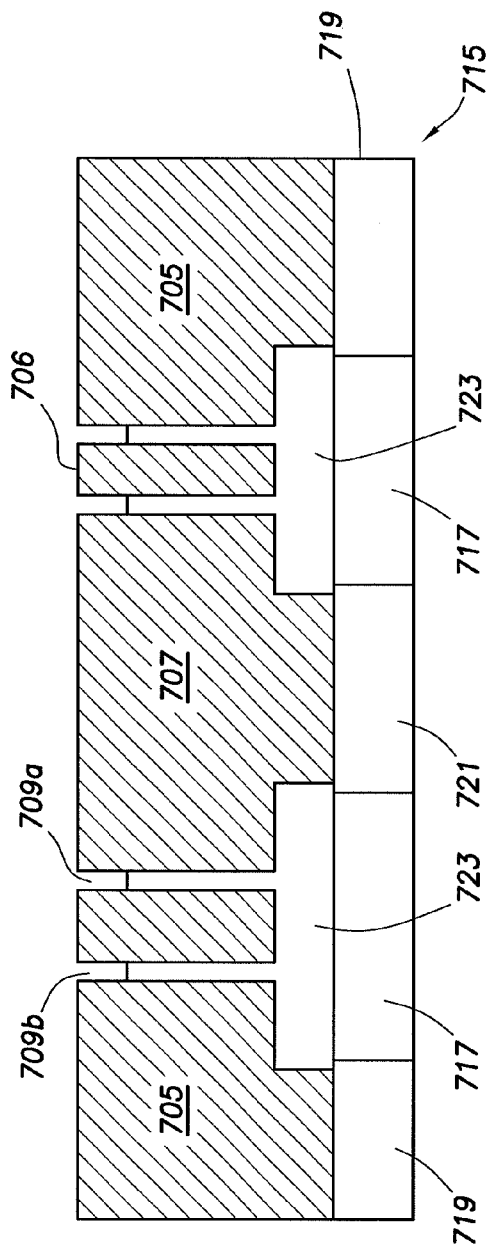
Figure 10C:
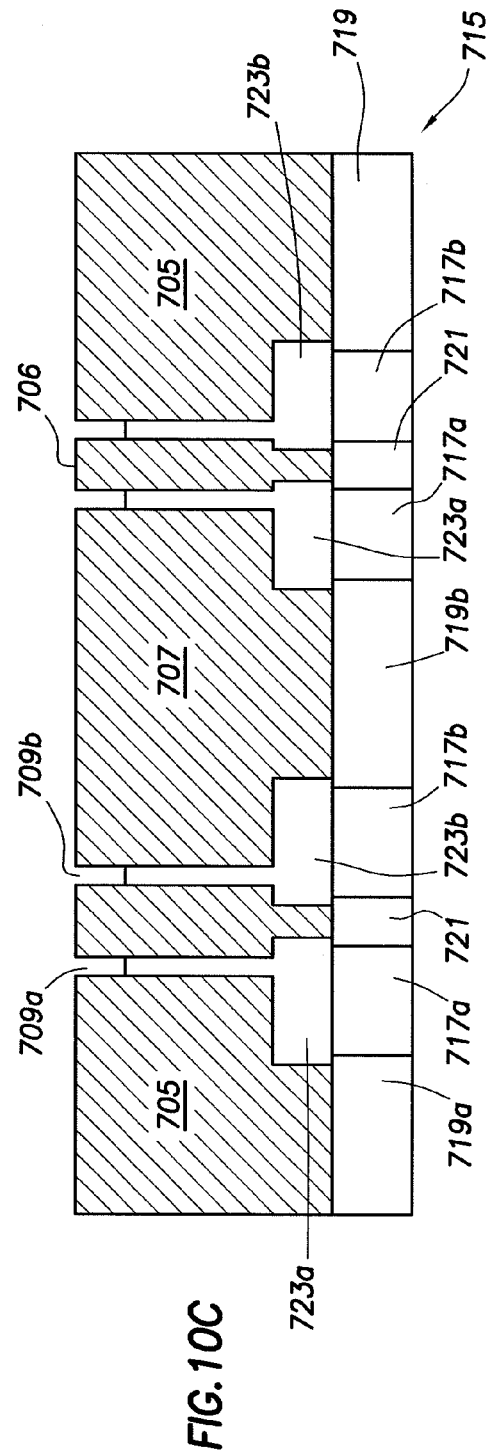
Figure 10D:
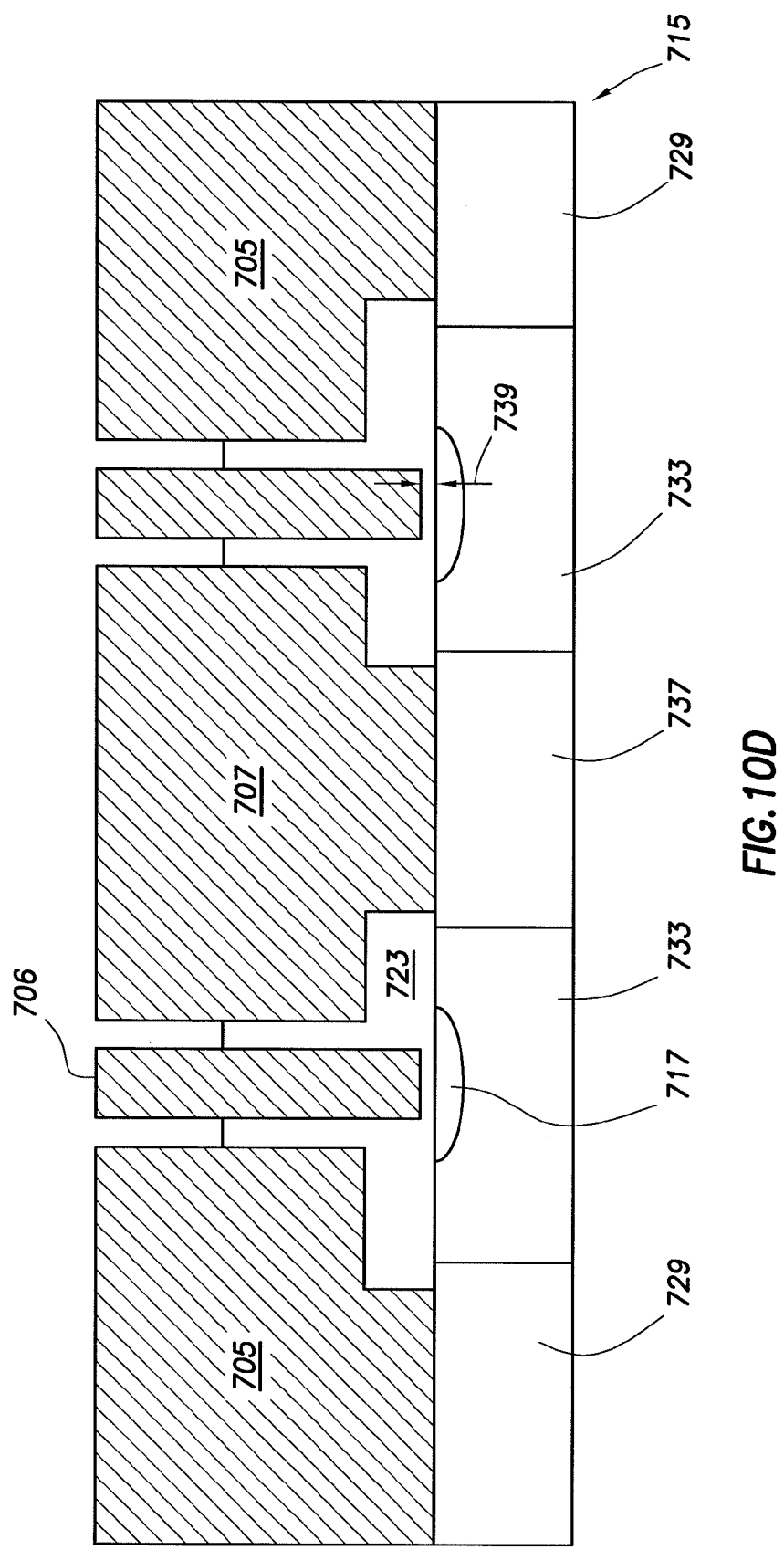

FIGS. 10B-10D show cross-sections taken along line 1007 of the concentric ring terahertz modulator in accordance with one or more embodiments of the invention. For simplicity, the cross-section of a single concentric ring aperture is shown to further illustrate an architecture of the device in accordance with one or more embodiments of the invention. In accordance with one or more embodiments of the invention, the concentric ring modulator may be configured with both apertures sharing one P-I-N junction as shown in FIG. 10B, or with each ring aperture having its own P-I-N junction as shown in FIG. 10C to allow for independent controllability of each ring.

Accordingly, the transmission through the concentric ring aperture shown in FIG. 10B may be switched in a manner that is substantially similar to the method used to switch the single ring aperture of FIG. 7B. Located beneath the metal layer island portion 707 and continuous portion 705 is semiconductor layer 715. Semiconductor layer 715 further includes carrier region 717, which may be formed of intrinsic silicon, underdoped silicon, or the like. Carrier region 717 is located directly below apertures 709a and 709b and is interposed between p-doped region 719 and n-doped region 721. Accordingly, carrier region 717, p-doped region 719, and n-doped region 721 form a P-I-N junction, with insulating oxide layer 723 disposed directly above the carrier region 717. Continuous layer portion 705 is electrically connected to p-doped region 719. Furthermore, island layer portion 707 is electrically connected to the n-doped region 721. In accordance with one or more embodiments of the invention, one, or both, of p-doped region 719 and n-doped region 721 may be highly doped to ensure ohmic contact between the metal film portion and the semiconductor layer.

In accordance with one or more embodiments of the invention, the free carrier density within carrier region 717 may be modified by applying a voltage across continuous layer portion 705 and island layer portion 707. Carrier region 717, p-doped region 719, and n-doped region 721 form a P-I-N junction and, thus, a forward biasing of the device (i.e., $V_P > V_N$, where $V_P$ is the voltage applied to the p-doped region 719 and $V_N$ is the voltage applied to the n-doped region 721) will result in an increase of the free carrier density in the carrier region 717. As illustrated in FIG. 6A, above, an increase in the free carrier density in the carrier region 717 has the effect of reducing the transmission of terahertz waves through the modulator. Accordingly, the amplitude of the terahertz wave may be modulated by switching the bias voltage applied across the P-I-N junction. In accordance with one or more embodiments of the invention, the carrier region may be formed from intrinsic silicon, which generally has a low conductivity. Thus, when no voltage is applied across the device, the terahertz transmission is maximal. Alternatively, a low conductivity state may be accomplished by reverse biasing the device $V_P < V_N$. Conversely a high-attenuation, i.e., a high conductivity state within carrier region 717, state may be achieved by forward biasing the device to inject free carriers into the intrinsic silicon carrier region 717.

The architecture of the concentric ring aperture shown in FIG. 10C allows for the independent switching of each ring. The independent switching is accomplished by forming a P-I-N junction for each ring aperture. Thus, aperture 709a may be switched by modulating the carrier density in the P-I-N junction formed from p-doped region 719a, carrier region 717a, and n-doped region 721. More specifically, the free carriers may be injected into the carrier region 717a by applying a forward bias across the P-I-N junction. This is accomplished by applying a voltage to continuous metal portion 705 that is higher (i.e., more positive) than the voltage applied to ring-shaped metal portion 706. Similarly, the aperture 709b may be switched by modulating the carrier density in the P-I-N junction formed by n-doped region 721, carrier region 717b, and p-doped region 719b. More specifically, the free carriers may be injected into the carrier region 717b by applying a forward bias across the P-I-N junction. This is accomplished by biasing island metal portion 707 at a voltage that is higher (i.e., more positive) than ring-shaped metal portion 706.

FIG. 10D shows a cross-section taken along line 1007 of the terahertz modulator in accordance with one or more embodiments of the invention. For simplicity, the cross-section of one concentric ring aperture is shown to further illustrate an architecture of the device in accordance with one or more embodiments of the invention. Located beneath the metal layer island portion 707 and continuous metal layer portion 705 is semiconductor layer 715. Semiconductor layer 715 further includes high resistivity region 733, which may be formed of a high-resistivity material such as intrinsic or low doped silicon. Continuous layer portion 705 is electrically connected to the high-resistivity region 733 by way of highly p-doped (or highly n-doped) ohmic contact region 729. Island metal layer portion 707 is electrically connected to the high-resistivity region 733 by way of highly p-doped (or highly n doped) ohmic contact region 737.

In accordance with one or more embodiments of the invention, the modulator, as shown in FIG. 10D takes the form of a MOS device. The ring-shaped metal portion 706 is electrically isolated from both the continuous metal layer portion 705 and high resistivity region 733, by way of oxide layer 723, which may be formed from $SiO_2$, or the like. In addition, in accordance with one or more embodiments of the invention, ring-shaped metal portion 706 serves as a metal-oxide-semiconductor (MOS) gate for the MOS structure that includes ring-shaped metal portion 706, oxide layer 723, semiconductor layer 715, and continuous metal layer portion 705.

In accordance with one or more embodiments of the invention, for architectures that employ highly doped p+ regions 729 and 737, the high-resistivity region 733 may be formed from p− or intrinsic semiconductor material. In this configuration, when a negative voltage is applied to the ring-shaped metal portion 706, holes will accumulate in the carrier region 717. Thus, when the negative voltage is applied, the modulator is in a low transmission state because the free carriers (holes) absorb the terahertz wave. In contrast, when the voltage on the gate is 0, the transmission through the modulator is high. However, for architectures that employ highly doped n+ regions 729 and 737, the high-resistivity region 733 may be formed from n− or intrinsic semiconductor material. When a positive voltage is applied to the ring-shaped metal portion 706, electrons will accumulate in the carrier region 717. Thus, when the positive voltage is applied, the modulator is in a low transmission state because the free carriers (electrons) absorb the terahertz wave. In contrast, when the voltage on the gate is 0, the transmission through the modulator is high.

In accordance with one or more embodiments, the MOS architecture may be implemented by setting the thickness 739 of the oxide layer 723 directly beneath the ring-shaped metal portion 706 may be 1-10 nm. One of ordinary skill will appreciate that these precise widths may be adjusted depending on the types of materials used and voltages being applied.

While the embodiments shown in FIGS. 10A-10D show an embodiment which employ two concentric circular ring-shaped apertures, any shape may be employed for the rings without departing from the scope of the present invention e.g., square ring-shaped, oval ring-shaped, and polygonal ring-shaped. Furthermore, any number of concentric rings may be employed, depending on the desired frequency characteristic for the device. For example, by employing a large number of concentric rings, a device having a broadband frequency response may be constructed. Furthermore, in accordance with one or more embodiments of the invention, the width of the ring-shaped metal portion 706, may vary depending on whether individual control of the ring apertures is desired. For example, in accordance with one or more embodiments of the invention, individual control of the apertures may be accomplished with a width of the ring-shaped metal portion 706 of greater than about 5 µm. However, embodiments of the invention may alternatively employ a different width of the ring-shaped metal portion 706.

Figure 11A:
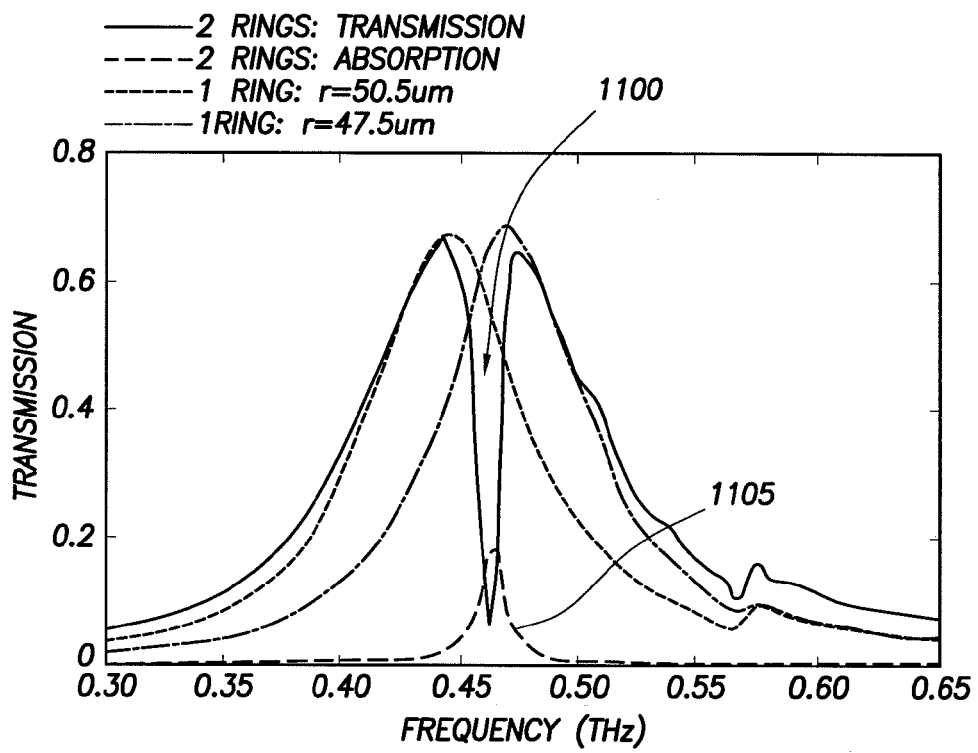
FIGS. 11A-11D show the simulated performance of a terahertz modulator in accordance with one or more embodiments of the invention.
Figure 11B:
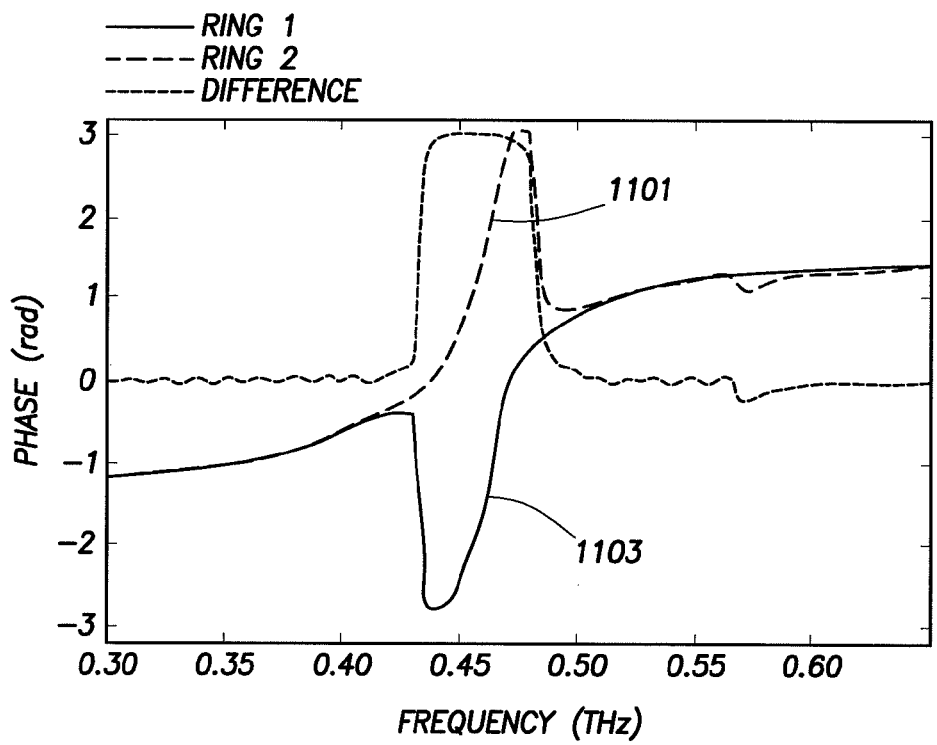
Figure 11C:
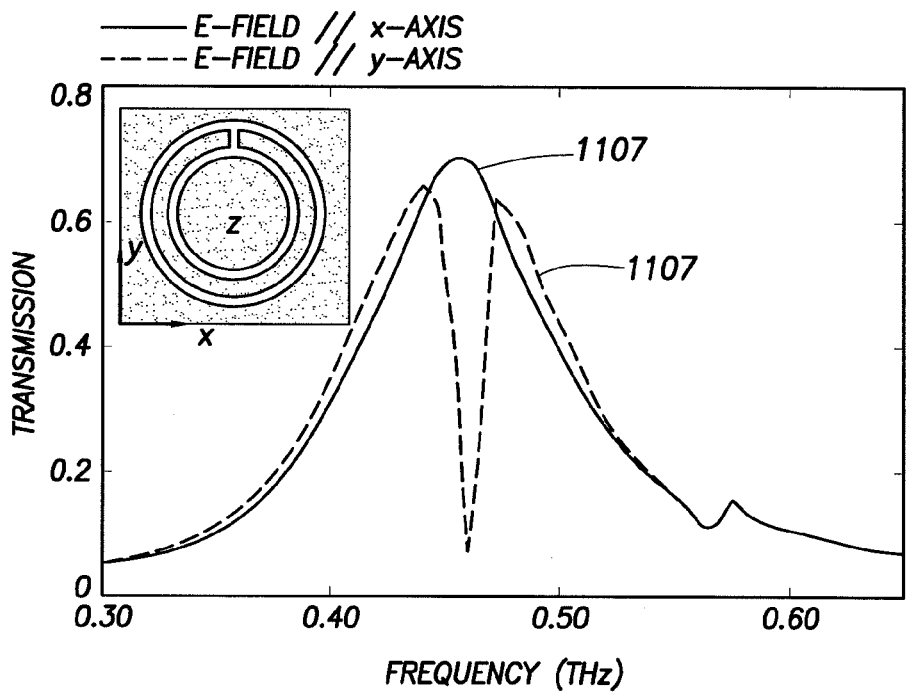

FIG. 11A shows the results of a 3D Finite-difference time-domain (FDTD) simulation of normal-incident broadband terahertz waves polarized along x-axis passing through two concentric circular ring apertures in a 1-µm-thick metal film on an intrinsic silicon substrate. The two 1-µm-wide concentric circular ring apertures have radii of $r_1$=47.5 µm and $r_2$=50.5 µm, with a 2-µm-wide gap between them. The simulated transmission spectrum is shown as the solid line, where a sharp Fano resonant dip 1100 with central frequency of 0.46 THz can be clearly seen. The dashed lines show the transmission peak of the individual ring apertures. From FIG. 11B, one can see that phases of the E-field at aperture $r_1$ (1101) and $r_2$ (1103) differ by ~π around the Fano resonance dip, confirming that the dark mode is excited. Since the dark mode is not directly coupled to radiation, it has a much longer lifetime and the E-field can accumulate to significantly higher amplitude than can the bright mode. The simulation shows that the peak E-field intensity ($|E|^2$) in the aperture is over 100,000 times higher than that of the incident wave when the dark mode is excited. Because of the high field intensity, the metal loss is also higher when the dark mode is excited, as the absorption spectrum represented by line 1105 in FIG. 11A shows. Thus, the device shown in the inset of FIG. 11C provides for a polarization sensitive device.

The bright mode and the dark mode have very different patterns of charge motion (current flow). In the bright mode, the charges in the metal between two apertures oscillate along the radial direction. In the dark mode, the charges move along the azimuthal direction in the metal between the apertures, and the current flow is largest at the minimum E-field location. Therefore, if the metal between two apertures is cut at minimum E-field location, the azimuthal movement of charges is stopped and the dark mode is suppressed, while the bright mode is not affected. That leads to the disappearance of the Fano resonance dip as line 1107 in FIG. 11C shows. If the polarization of the incident wave is rotated 90 degrees, the cut is at maximum E-field location where the azimuthal current flow is zero. Therefore the dark mode and Fano resonance dip is not affected by the cut as line 1109 in FIG. 11C shows.

Figure 11D:
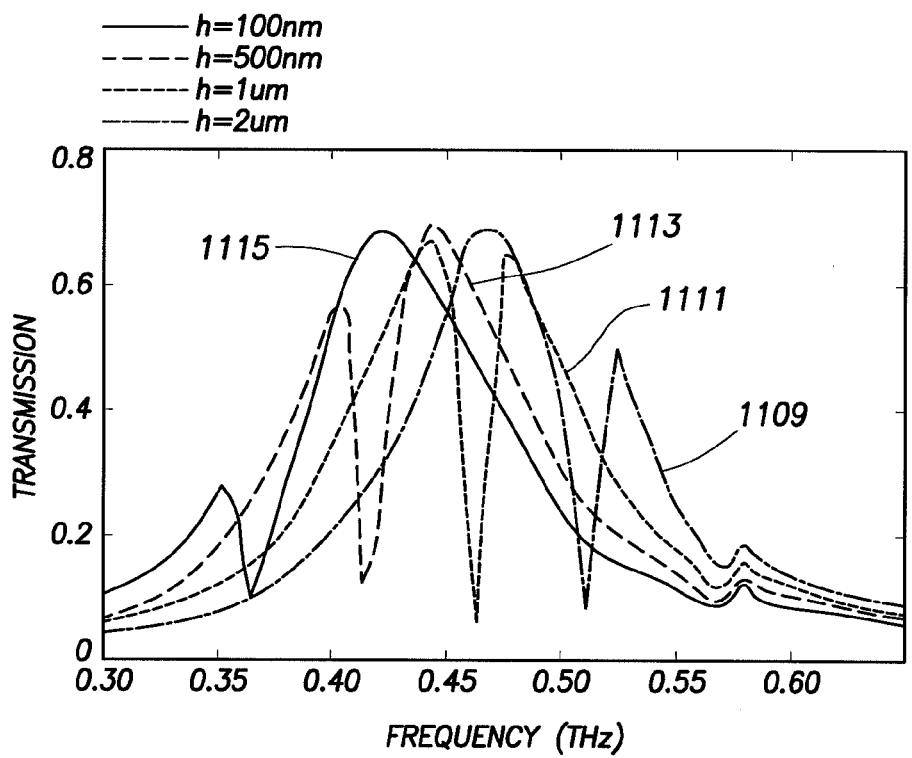

The central frequency of the Fano resonance feature can be tuned by varying the thickness of the metal layer, as shown in FIG. 11D. When the thickness of the metal increases, both the bright mode and the dark mode blue-shift (i.e., shifts toward higher frequencies), but the dark mode blue-shifts much more than the bright mode. With thin metal, the dark mode has lower resonant frequency than the bright mode, but when the metal thickness increases beyond 1 µm, the dark mode has a higher frequency. FIG. 11D shows the location of the Fano resonance for different metal layer thicknesses: line 1109 corresponds to a thickness of 2 µm, line 1111 corresponds to a thickness of 1 µm, line 1113 corresponds to a thickness of 0.500 µm, and line 1115 corresponds to a thickness of 0.100 µm.

Figure 12B:
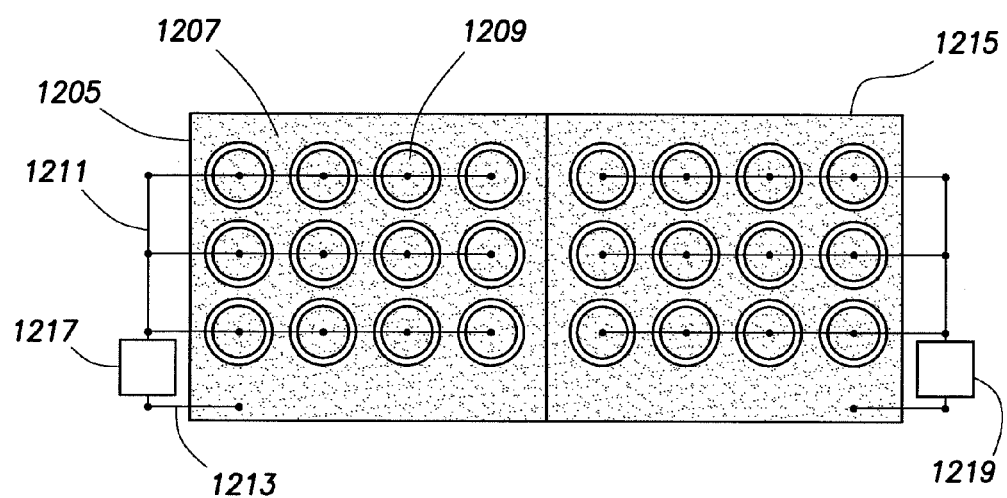
FIG. 12A-12B shows a spatial light modulator for terahertz radiation in accordance with one or more embodiments of the invention.
Figure 12A:
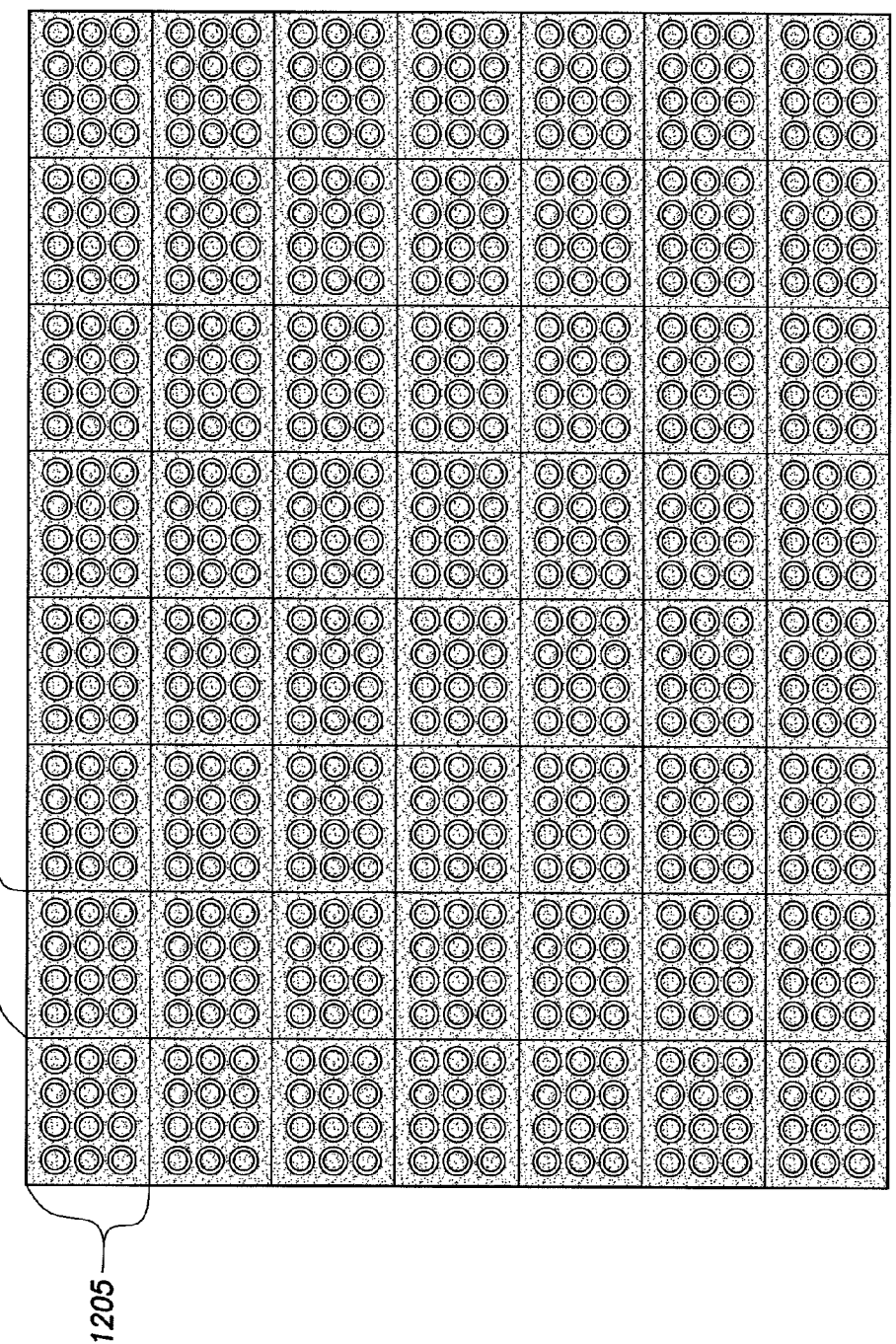

FIG. 12A shows a terahertz spatial light modulator in accordance with one or more embodiments of the invention. More specifically, FIG. 12 shows that the spatial light modulator 1201 may be constructed from an array of terahertz modulators 1203. Each terahertz modulator 1203 may be of the design and construction described above. Furthermore, each element (i.e., each individual terahertz modulator element) of the terahertz spatial light modulator 1201 may be modulated independently of the other elements. In other words, the device may be understood to be composed of individually controllable modulator pixels, each pixel formed from an individual terahertz modulator 1203. Accordingly, the terahertz spatial light modulator 1201 may spatially modulate (in two dimensions) the wave front of a terahertz beam. Such a device may be employed, for example, in compressed or single pixel, imaging applications using terahertz waves.

In accordance with one or more embodiments of the invention, FIG. 12B shows the electrical interconnects that may allow for the independent controllability of two pixels of the terahertz spatial light modulator. Terahertz modulator (or pixels) 1205 and 1215 are each independently controllable terahertz modulators and may be configured as described above, for example in FIGS. 7-10. Accordingly, terahertz modulator 1205 includes a first modulator metal layer 1207 and a plurality of island metal layers 1209. Terahertz modulator 1205 further includes electrical interconnect 1211, which connects together the plurality of island metal layers 1209. Terahertz modulator 1205 further includes electrical interconnect 1213, which connects to the first modulator metal layer 1207. Accordingly, the first modulator may be controlled by way of voltage source 1217. In addition, terahertz modulator 1215 may be configured in a manner substantially similar to terahertz modulator 1205, except for the fact that terahertz modulator 1215 is electrically isolated from terahertz modulator 1205 and, thus, may be controlled independently of terahertz modulator 1205 by way of voltage source 1219. One of ordinary skill will appreciate that, without departing from the scope of the present disclosure, any number of terahertz modulators may be configured as described above to form a spatial light modulator of any desired number of pixels. Furthermore, one of ordinary skill will appreciate that FIGS. 12A-12B are schematic diagrams that illustrate one possible example arrangement of the pixels and interconnects, and, thus, the embodiments of the invention are not limited to the simple pixel arrangement and interconnect topology shown here. For example, the spatial light modulator may be constructed from a multilayer device that is similar to that shown above in FIGS. 8-10. Furthermore, one of ordinary skill will appreciate that voltage sources 1215 and 1217 need not be separate, but, rather, may be integrated into a single unit that includes multiple input and output channels. Furthermore, the shape of the individual apertures, while shown to be circular rings in FIG. 12, may be of any shape and size and, furthermore, the apertures within a single pixel may include apertures of different shape and size. Alternatively, the aperture shapes and sizes may be grouped on a pixel by pixel basis, if desired, for a particular application. For example, tailoring the spectral response of each pixel individually may enable the use of compressive sensing strategies to form multispectral images.

Figure 13:
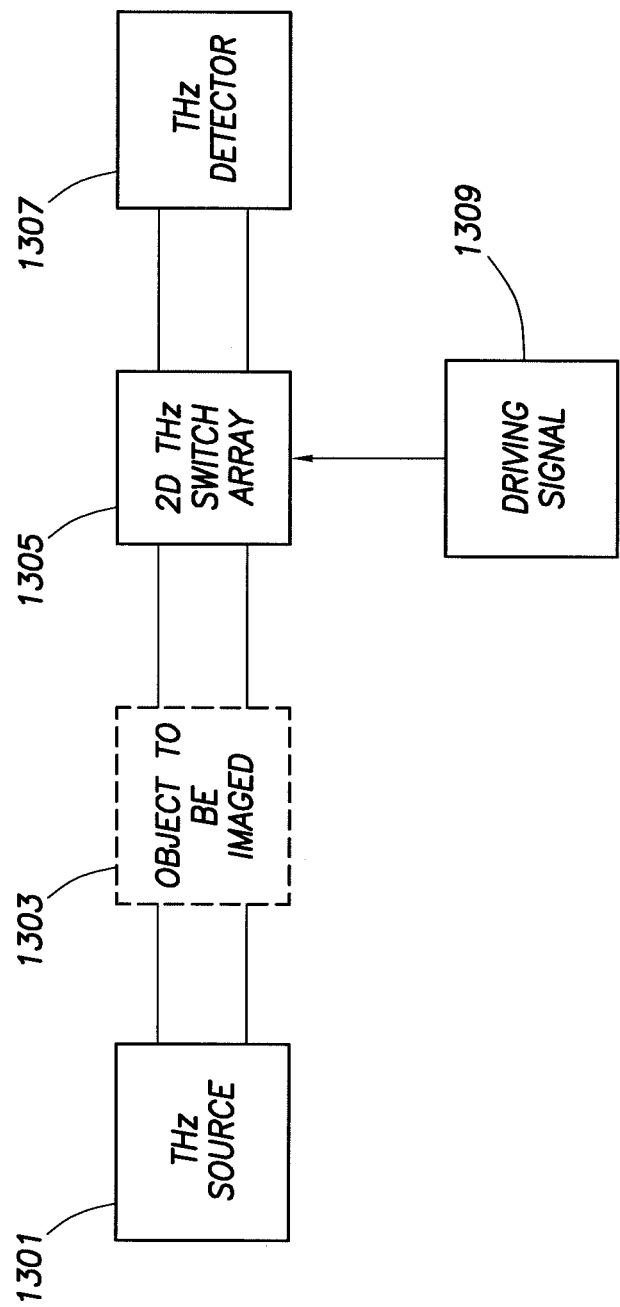
FIG. 13 shows an imaging system employing a spatial light modulator for terahertz radiation in accordance with one or more embodiments of the invention.

FIG. 13 shows an imaging system employing a spatial light modulator for terahertz beams. The system includes a terahertz source 1301 which illuminates a sample 1303 with a terahertz beam. The light scattered from and/or transmitted through the illuminated sample then passes through the spatial light modulator 1305 and is subsequently focused onto a terahertz detector 1307. The driving signal 1309 is used to switch individual pixels of the spatial light modulator 1305 according to the imaging application being employed. For example, in the case of compressed imaging, the driving signal may cause several different, spatially random pixels to be set to absorb, while the other pixels may be set to transmit. However, one of ordinary skill will appreciate that virtually any pattern may be encoded onto the wave front of the terahertz beam by choosing the driving signal accordingly.

In accordance with one or more embodiments of the invention, a ring aperture terahertz modulator allows for the metal inside and outside of the ring to be electrically isolated, thereby allowing the two metal portions to be used as two electrodes. In accordance with one or more embodiments of the invention, a ring aperture terahertz modulator allows for electrical control of the carrier density only in the area underneath the aperture. Compared to controlling the carrier density in the whole area underneath the metal, this design minimizes the power consumption and maximizes the operation speed.

Furthermore, in accordance with one or more embodiments of the invention, a transmission of 60% can be obtained for an aperture array with only 1.4% open area by exploiting the ETT phenomena. This high transmission can be suppressed by over 18 dB with a thin layer of free carriers in the silicon substrate underneath the metal film. A P-I-N junction, PN junction, or MOS structure may be used in accordance with one or more embodiments of the invention to control the carrier density just beneath the aperture. In accordance with one or more embodiments of the invention, the P-I-N junction can introduce larger change in the number of carriers in the aperture region than the carrier depletion junctions typically used. Furthermore a switching speed on the order of 10 Gbps can be achieved with this type of junction. In accordance with one or more embodiments of the invention, the design in accordance with one or more embodiments of the invention is also compatible with pixilation, providing the opportunity for building a high-speed high-contrast terahertz spatial light modulator.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A device, comprising:
    a metal layer comprising a first metal portion and a second metal portion, wherein the first metal portion and the second metal portion are separated by an aperture, wherein the first metal portion and the second metal portion are not directly connected in the metal layer; and
    a semiconductor layer affixed to a bottom surface of the metal layer and comprising a carrier region located below the aperture, wherein transmission of terahertz waves through the aperture is modulated by changing a voltage applied across the aperture.

2. The device of claim 1, wherein changing the voltage applied across the aperture changes a carrier density in the carrier region.

3. The device of claim 1, wherein the semiconductor layer comprises a p-doped region and a n-doped region, wherein the carrier region is interposed between the p-doped region and the n-doped region, and wherein the carrier region is not doped.

4. The device of claim 1, wherein the metal layer comprises one selected from a group consisting of gold, copper, and aluminum.

5. The device of claim 1, wherein the aperture is ring-shaped.

6. The device of claim 1 wherein the aperture is one selected from a group consisting of circular ring-shaped, square ring-shaped, oval ring-shaped, and polygonal ring-shaped.

7. A device, comprising:
    a metal layer comprising a first metal region, a second metal region, and a third metal region, wherein the first metal region and the second metal region are separated by a first aperture in the metal layer, wherein the first metal region and the third metal region are separated by a second aperture in the metal layer, and wherein the first metal region, the second metal region, and the third metal region are not directly connected in the metal layer; and
    a semiconductor layer affixed to a bottom surface of the metal layer and comprising a first carrier region located below the first aperture and a second carrier region located below the second aperture, wherein transmission of terahertz waves through the first aperture is modulated by changing a voltage applied across the first aperture, and wherein transmission of terahertz waves through the second aperture is modulated by changing a voltage applied across the second aperture.

8. The device of claim 7, wherein the first aperture and the second aperture are ring-shaped and concentric.

9. The device of 7, wherein the voltage applied across the first aperture is different than the voltage applied across the second aperture.

10. The device of claim 7, wherein the second metal region is one selected from a group consisting of rectangular, square-shaped, circular, annular-shaped, oval shaped, and, polygonal shaped.

11. The device of claim 7, wherein the first metal region and the second metal region are the same shape.

12. The device of claim 7, wherein the first metal region and the second metal region are different shapes.

13. The device of claim 7, further comprising:
    a source configured to emit terahertz waves, wherein a sample is interposed between the source and the semiconductor layer, and wherein the sample is illuminated using the terahertz waves.

14. The device of claim 7, wherein the transmission of terahertz waves through the first aperture and the transmission of terahertz waves through the second aperture are modulated to obtain information for use in compressed sensing.

15. The device of claim 7, wherein the device is a terahertz modulator.

16. A method for modulating transmission of terahertz waves, comprising:
    modulating a voltage across a ring-shaped aperture, wherein the ring-shaped aperture is formed in a metal layer comprising a first region and a second region, wherein the ring-shaped aperture separates the first region and the second region in the metal layer, wherein a semiconductor is attached to a bottom surface of the metal layer and wherein a carrier region of the semiconductor is located below the ring-shaped aperture; and
    detecting terahertz waves that transmitted through the ring-shaped aperture.

17. The method of claim 16, further comprising:
illuminating a sample with terahertz waves, wherein the sample is interposed between a source of terahertz waves and the ring aperture.

18. A device comprising:
a first terahertz modulator comprising:
- a first modulator metal layer;
- a first modulator semiconductor layer;
- a plurality of first modulator island metal layers, wherein the first modulator metal layer and the plurality of first modulator island metal layers are separated by a plurality of ring-shaped apertures; and
- a plurality of carrier regions within the first modulator semiconductor layer, wherein the plurality of carrier regions are disposed under the plurality of ring-shaped apertures, wherein transmission of terahertz waves through the plurality of ring-shaped apertures is modulated by changing a first voltage applied between the first modulator metal layer and the plurality of first modulator island metal layers;

a second terahertz modulator comprising:
- a second modulator semiconductor layer;
- a plurality of second modulator island metal layers, wherein the second modulator metal layer and the plurality of second modulator island metal layers are separated by a plurality of ring-shaped apertures; and
- a plurality of carrier regions within the second modulator semiconductor layer, wherein the plurality of carrier regions are disposed under the plurality of ring-shaped apertures, wherein transmission of terahertz waves through the plurality of ring-shaped apertures is modulated by changing second voltage applied between the second modulator metal layer and the plurality of second modulator island metal layers;

a first electrical interconnect electrically connected to the first terahertz modulator, wherein the first electrical interconnect is configured to provide the first voltage; and a second electrical interconnect electrically connected to the second terahertz modulator, wherein the second electrical interconnect is configured to provide the second voltage.

19. The device of claim 18, further comprising:
a source configured to emit terahertz waves, wherein a sample is interposed between the source and the device, and wherein the sample is illuminated using the terahertz waves; and
a detector, wherein the detector is configured to detect terahertz waves that are transmitted through at least one selected from a group consisting of the first terahertz modulator and the second terahertz modulator.

20. The device of claim 19, wherein the detector is a single-pixel detector.

* * * * *